(12) United States Patent
Tomimatsu et al.

(10) Patent No.: US 9,199,853 B2
(45) Date of Patent: Dec. 1, 2015

(54) METAL OXIDE POWDER AND METHOD FOR MANUFACTURE THEREOF

(75) Inventors: Wakana Tomimatsu, Yamaguchi (JP);
Tadahiro Fukuju, Yamaguchi (JP);
Hiroshi Numa, Yamaguchi (JP)

(73) Assignee: TOKUYAMA CORPORATION, Shunan-shi, Yamaguchi (JP)

( * ) Notice: Subject to any disclaimer, the term of this patent is extended or adjusted under 35 U.S.C. 154(b) by 0 days.

(21) Appl. No.: 14/110,473

(22) PCT Filed: Apr. 25, 2012

(86) PCT No.: PCT/JP2012/061134
§ 371 (c)(1),
(2), (4) Date: Oct. 8, 2013

(87) PCT Pub. No.: WO2012/147812
PCT Pub. Date: Nov. 1, 2012

(65) Prior Publication Data
US 2014/0057111 A1 Feb. 27, 2014

(30) Foreign Application Priority Data
Apr. 28, 2011 (JP) .................................. 2011-101640

(51) Int. Cl.
*C01B 33/159* (2006.01)
*C01B 13/32* (2006.01)
*C01B 33/18* (2006.01)

(52) U.S. Cl.
CPC ............. *C01B 33/159* (2013.01); *C01B 13/328* (2013.01); *C01B 33/18* (2013.01); *C01P 2004/32* (2013.01); *C01P 2004/34* (2013.01); *C01P 2006/12* (2013.01); *C01P 2006/14* (2013.01); *Y10T 428/2982* (2015.01)

(58) Field of Classification Search
CPC .... C01B 33/159; C01B 13/328; C01B 33/18; Y10T 428/2982; C01P 2004/32; C01P 2004/34; C01P 2006/12; C01P 2006/14
USPC ........................................... 428/402; 423/338
IPC ... C01B 13/328, 33/18, 33/159; C01P 2004/32, C01P 2004/34, 2006/12, 2006/14
See application file for complete search history.

(56) References Cited

U.S. PATENT DOCUMENTS

| | | | |
|---|---|---|---|
| 4,402,927 A * | 9/1983 | von Dardel et al. | 423/335 |
| 5,270,027 A * | 12/1993 | Balducci et al. | 423/338 |
| 5,795,556 A * | 8/1998 | Jansen et al. | 423/338 |
| 5,830,387 A | 11/1998 | Yokogawa et al. | |
| 5,888,425 A | 3/1999 | Schwertfeger et al. | |
| 6,103,209 A * | 8/2000 | Balducci et al. | 423/338 |
| 6,197,270 B1 * | 3/2001 | Sonoda et al. | 423/338 |

FOREIGN PATENT DOCUMENTS

| | | | |
|---|---|---|---|
| CA | 2 291 229 | A1 | 12/1998 |
| CN | 1181053 | A | 5/1998 |
| CN | 1258228 | A | 6/2000 |
| CN | 1715182 | A | 1/2006 |
| CN | 101318659 | A | 12/2008 |
| CN | 101538046 | A | 9/2009 |
| CN | 101844771 | A | 9/2010 |
| DE | 4342548 | A1 | 6/1995 |
| DE | 19722738 | A1 | 12/1998 |
| EP | 0537851 | A1 | 4/1993 |
| EP | 0653378 | A1 | 5/1995 |
| EP | 0658513 | A1 | 6/1995 |
| EP | 0 849 220 | A1 | 6/1998 |
| EP | 2703348 | * | 3/2014 |
| JP | 63-258642 | A | 10/1988 |
| JP | 3-047528 | * | 2/1991 |
| JP | 03-047528 | A | 2/1991 |
| JP | 04-54619 | B2 | 8/1992 |
| JP | 05-213614 | A | 8/1993 |
| JP | 06-040714 | A | 2/1994 |
| JP | 07-196311 | A | 8/1995 |
| JP | 07-257918 | A | 10/1995 |
| JP | 10-236817 | A | 9/1998 |
| JP | 2000-143228 | * | 5/2000 |
| JP | 2000-143228 | A | 5/2000 |
| JP | 2000-225767 | * | 8/2000 |
| JP | 2000-225767 | A | 8/2000 |
| JP | 2001-070741 | A | 3/2001 |
| JP | 2001-080915 | A | 3/2001 |
| JP | 2002-500557 | A | 1/2002 |
| JP | 2008-247696 | | 10/2008 |
| WO | 94/25149 | A1 | 11/1994 |
| WO | 96/22942 | A1 | 8/1996 |
| WO | 98/53905 | A1 | 12/1998 |

OTHER PUBLICATIONS

USPTO RR dated Jun. 12, 2014 in connection with U.S. Appl. No. 13/825,187.
USPTO NFOA dated Nov. 6, 2014 in connection with U.S. Appl. No. 13/825,187.
U.S. Appl. No. 13/825,187, filed Mar. 20, 2013.
Chul Oh, et al; "Distribution of Macropores in Silica Particles Prepared by Using Multiple Emulsions", Journal of Colloid and Interface Science 254, pp. 79-86; published online Sep. 16, 2002.
USPTO NFOA dated Mar. 27, 2015 in connection with U.S. Appl. No. 13/825,187.
USPTO NOA mailed Aug. 14, 2015 in connection with U.S. Appl. No. 13/825,187.
Elliott P. Barrett, et al; "The Determination of Pore Volume and Area Distributions in Porous Substances. I. Computations from Nitrogen Isotherms", J. American Chem. Soc., Jan. 1951, pp. 373-380.

(Continued)

*Primary Examiner* — Leszek Kiliman
(74) *Attorney, Agent, or Firm* — Ladas & Parry LLP

(57) ABSTRACT

The present invention provides a globular-shaped metal oxide powder with excellent thermal insulation performance and reduced bulk density, and a method of manufacture thereof, wherein the metal oxide powder has globular independent particles as the main component, and has BET specific surface area of 400 to 1000 m$^2$/g, BJH pore volume of 2 to 8 mL/g, and oil absorption of no less than 250 mL/100g. The present invention also provides a method for manufacturing the hollow and globular shaped metal oxide powder including the step of forming an O/W/O emulsion.

8 Claims, 8 Drawing Sheets

(56) References Cited

OTHER PUBLICATIONS

"Catalyst Support Preparation and Application Technology", Petroleum Industry Press, Beijing; May 2002; pp. 538-539.

"Advanced Composite Materials", National Defense Industry Press, Beijing, May 2013; pp. 278-279.

"Technology of Chemicals for Paper Making", South China University of Technology Press, Aug. 2009; pp. 256-257.

* cited by examiner

METAL OXIDE POWDER AND METHOD FOR MANUFACTURE THEREOF

TECHNICAL FIELD

The present invention relates to a novel metal oxide powder and a method for manufacture thereof. In specific, it relates to a metal oxide powder which has a large specific surface area, a large pore volume, a large oil absorption, and globular particles, shows excellent thermal insulation performance, and is useful as a thermal insulator, a filler and an additive for various uses, and the like.

BACKGROUND ART

Among metal oxide powders, those having a large specific surface area and a large pore volume show excellent thermal insulation performance. In particular, those produced by drying a liquid in a gel product while inhibiting shrinkage thereof which is caused by the drying (i.e. drying shrinkage) are called aerogels, and are favorably employed as materials for various thermal insulation purposes.

The aerogels are materials with high porosity and excellent thermal insulation properties. Herein, the aerogels refer to solid materials with a porous structure having air as a dispersion medium, and specifically refer to solid materials having a porosity of 60% or more. The porosity represents the amount of air in an apparent volume of a material by a volume percentage. Heat transfer in a material involves solid conduction (transmission of thermal vibrations), convection, and radiation, and in general, contribution of convection to heat transfer is largest in a material having a large porosity. In contrast to this, since the aerogels have a very small pore size of about 10 to 100 nm, transfer of the air through voids is greatly obstructed and heat transfer by convection is significantly inhibited. As such, the aerogels have excellent thermal insulation properties.

For example, a method for producing a silica aerogel is known in which a hydrolysis product of alkoxysilane employed as a starting material is subjected to polycondensation to afford a gelatinous compound, and the gelatinous compound is dried under a supercritical condition of a dispersion medium (Patent Document 1). Another method for producing a silica aerogel is also known in which an alkali metal silicate as a raw material is contacted with a cation exchange resin or a mineral acid is added to the alkali metal silicate as a raw material, to prepare a sol; and after gelation of the sol, a gel afforded thereby is dried under a supercritical condition of a dispersion medium (Patent Documents 2 and 3).

The known methods described above allow manufacture of aerogels with high porosity, by drying and removing the dispersion medium in the gel under the supercritical conditions of the dispersion medium and thereby replacing it with the air while inhibiting drying shrinkage of the gel. However, since enormous costs are needed to realize the supercritical conditions, actual applications of the aerogels obtained by drying under the supercritical conditions are limited to those that are special and worth such high costs. Therefore, a method of drying under atmospheric pressure intended for cost reduction is suggested (Patent Document 4).

There are various applications of the aerogels, including uses as core materials of vacuum thermal insulators or as additives for thermal insulation coatings. In such applications, a shape of an aerogel particle is important. For example, in the application of the aerogel as a core material of vacuum thermal insulators, it is important to reduce contribution of solid conduction (solid heat transfer) in order to further improve the thermal insulation performance of the aerogel, since convection does not contribute to heat transfer. Use of globular particles makes it possible to reduce a contact area (point of contact) between the particles and to therefore decrease heat transfer via contact of the particles. As such, using globular aerogel particles for core materials of vacuum thermal insulators can further improve the thermal insulation performance of the vacuum thermal insulators. In the application of the aerogel as an additive for coating materials as well, making the aerogel particles globular can improve a filling factor of the particles.

There is suggested a method for manufacturing a globular shaped aerogel, including: mixing an acid with an alkali metal silicate by using a mixing nozzle; thereafter spraying a resultant mixture; and making a droplet of the mixture directly into a gel (Patent Document 5).

However, the aerogel having a globular particle shape tends to have a high bulk density due to good fluidity thereof. Since the bulk density and solid heat transfer are generally in a positive correlation with each other, reducing the bulk density is expected to lead to further reduction of solid heat transfer. Therefore, in the application of the aerogel having a globular particle shape as a core material for vacuum thermal insulators or in other applications, reduction of the bulk density is especially desired.

CITATION LIST

Patent Documents

Patent Document 1: U.S. Pat. No. 4,402,927
Patent Document 2: Japanese Patent Application Laid-Open (JP-A) No. H10-236817
Patent Document 3: JP-A No. H06-040714
Patent Document 4: JP-A No. H07-257918
Patent Document 5: JP-A No. 2002-500557

SUMMARY OF THE INVENTION

Problems to be Solved by the Invention

Accordingly, an object of the present invention is to provide: a globular shaped metal oxide powder with excellent thermal insulation properties and reduced bulk density; and a method for manufacture thereof.

Means for Solving the Problems

The inventors conducted intensive studies to solve the above problems and reached the idea of making one or more hollow space(s) in a globular aerogel particle. As a result of their further study, they have found that a hollow aerogel particle as above can be obtained by forming an O/W/O emulsion having a metal oxide sol as the W phase and causing gelation of the sol. Then they have completed the present invention.

A first aspect of the present invention is a metal oxide powder having globular independent particles as main component, the metal oxide powder having: BET specific surface area of 400 to 1000 $m^2/g$; BJH pore volume of 2 to 8 mL/g; and oil absorption of no less than 250 mL/100 g.

In the present invention, the term "metal oxide" is interpreted broadly and includes not only narrowly-defined metal oxides such as alumina ($Al_2O_3$), titania ($TiO_2$), and zirconia ($ZrO_2$), but also silica ($SiO_2$). Silicon (Si) is also regarded as a metal element. The "metal oxide" also includes multiple oxides (such as silica-alumina).

In the present invention, the "independent particle" is an antonym of an "agglomerated particle". The expression "having globular independent particles as main component" means that when a scanning electron microscope (SEM) image of no less than 2000 metal oxide powder particles observed at a magnification of 1000 by secondary electron detection using SEM is analyzed, the ratio of the number of globular independent particles to the total number of particles observed by SEM, that is, to the total number of particles that are entirely included in the SEM image, is no less than 50%. The ratio is preferably no less than 70%, more preferably no less than 80%, still more preferably no less than 85%, and may also be 100%. Herein, in determining the total number of particles observed by SEM, a group of particles forming one agglomerated particle is counted as one particle. Whether an independent particle is "globular" or not is judged by measuring a circularity of the independent particle in the SEM image. When the circularity is no less than 0.8, the independent particle is judged as being "globular". When it is less than 0.8, the independent particle is judged as not being "globular". The "circularity" of each particle is a value C determined by the following formula (1).

[Mathematical Formula 1]

$$C = \frac{4\pi S}{L^2} \quad (1)$$

In the formula (1), S represents an area (projected area) of the particle in the image. L represents a length of an outer periphery (perimeter) of the particle in the image.

In the present invention, the "BET specific surface area" means a value determined by: drying a sample for measurement at a temperature of 200° C. for no less than three hours under a reduced pressure of no more than 1 kPa; thereafter measuring an adsorption isotherm of only nitrogen adsorption side at liquid nitrogen temperature; and analyzing the adsorption isotherm by BET method. The pressure range used for the analysis is relative pressure of 0.1 to 0.25. The "BJH pore volume" refers to a pore volume which derives from a pore having a pore radius of 1 nm to 100 nm obtained by analyzing, by BJH method (Barrett, E. P.; Joyner, L. G.; Halenda, P. P., J. Am. Chem. Soc. 73, 373 (1951)), the adsorption isotherm of the adsorption side obtained in the same manner as above. The "oil absorption" refers to oil absorption measured by "Refined Linseed Oil Method" specified in JIS K5101-13-1.

In the metal oxide powder according to the first aspect of the present invention, the ratio of the oil absorption to the BJH pore volume is preferably no less than 0.70. The ratio is a value r determined by the following formula (2).

[Mathematical Formula 2]

$$r = \frac{A}{100B} \quad (2)$$

In the formula (2), A represents oil absorption [mL/100 g]. B represents BJH pore volume [mL/g].

The metal oxide powder according to the first aspect of the present invention preferably has an average particle circularity by image analysis method of no less than 0.80. The "average particle circularity by image analysis method" is an arithmetic mean of circularity obtained by image analysis of the SEM image of no less than 2000 powder particles observed at a magnification of 1000 by secondary electron detection using SEM. The "circularity" of each particle is a value C determined by the above formula (1). A group of particles forming one agglomerated particle is counted as one particle, as noted above.

The metal oxide powder according to the first aspect of the present invention preferably has an average particle size by image analysis method of 1 to 20 μm. The "average particle size by image analysis method" is an arithmetic mean of equivalent circle diameters obtained by image analysis of an SEM image of no less than 2000 powder particles observed at a magnification of 1000 by secondary electron detection using SEM. The "equivalent circle diameter" of each particle is a diameter of a circle having an area equal to the area of the particle in the image (i.e. projected area). A group of particles forming one agglomerated particle is counted as one particle, as noted above.

The metal oxide powder according to the first aspect of the present invention has preferably been hydrophobized.

A metal oxide constituting the metal oxide powder according to the first aspect of the present invention is preferably silica or a multiple oxide containing silica as the main component thereof. In the present invention, the expression "a multiple oxide containing silica as the main component thereof" means that a molar ratio of silicon (Si) in a group of elements other than oxygen contained in the multiple oxide is no less than 50% and less than 100%. The molar ratio is preferably no less than 65%, more preferably no less than 75%, and still more preferably no less than 80%.

A second aspect of the present invention is a method for manufacturing a hollow and globular shaped metal oxide powder including the step of forming an O/W/O emulsion. In the present invention, that the metal oxide powder is "hollow shaped" means that particles constituting the powder have one or more hollow space(s) therein. The "globular shaped metal oxide powder" refers to a metal oxide powder having globular independent particles as the main component. The meaning of "having globular independent particles as the main component" is as described above. The "O/W/O emulsion" refers to an emulsion (double emulsion) in which water droplet (W phase) particles having oil droplet (O phase) particles enclosed therein are dispersed in an oil phase (O phase).

The method for manufacturing the hollow and globular shaped metal oxide powder according to the second aspect of the present invention preferably includes the successive steps of:

(i) preparing an aqueous metal oxide sol;
(ii) forming the O/W/O emulsion wherein the aqueous metal oxide sol composes the W phase of the O/W/O emulsion;
(iii) causing gelation of the aqueous metal oxide sol, thereby converting the O/W/O emulsion into a dispersion of a gel;
(iv) replacing water in the dispersion with a solvent which has a surface tension at 20° C. of no more than 30 mN/m;
(v) treating the gel with a hydrophobing agent; and
(vi) removing the solvent used in the replacing step (iv).

A third aspect of the present invention is a thermal insulator having the metal oxide powder according to the first aspect of the present invention.

Effects of the Invention

The metal oxide powder according to the first aspect of the present invention has globular independent particles as the main component and has a large BET specific surface area and a large BJH pore volume. Therefore, it shows excellent thermal insulation performance. Since it has globular independent particles as the main component, it also shows excellent filling performance; and on the other hand, since it has a large oil absorption, the bulk density thereof is reduced. As such, it is of great use as a core material of vacuum thermal insulators, a filler or an additive for various uses, or cosmetics.

The method for manufacturing the hollow and globular shaped metal oxide powder according to the second aspect of the present invention includes the step of forming an O/W/O emulsion, thereby enabling manufacture of the metal oxide powder according to the first aspect of the present invention.

The thermal insulator according to the third aspect of the present invention has the metal oxide powder according to the first aspect of the present invention described above, and therefore can show improved thermal insulation performance.

MODES FOR CARRYING OUT THE INVENTION

Figure 1:
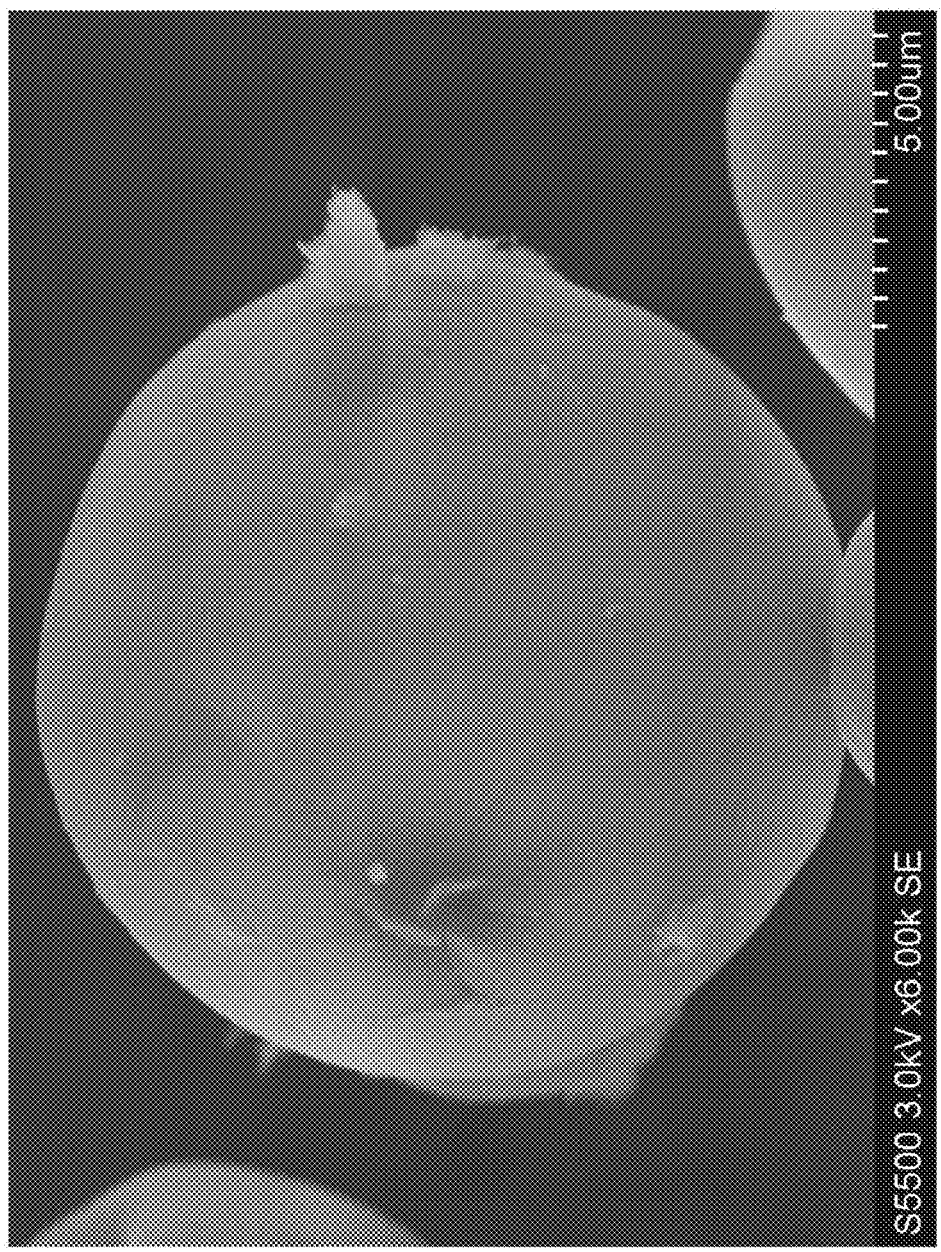
FIG. 1 is an SEM image, taken at an acceleration voltage of 3.0 kV, of an independent particle constituting a metal oxide powder of the present invention produced in Example 1.

Hereinafter, embodiments of the present invention will be described with reference to drawings. It should be noted that the embodiments shown below are examples of the present invention and that the present invention is not limited to the embodiments. The expression "A to B" for a numerical range means "no less than A and no more than 3", unless otherwise specified. When a unit is specified only for the numerical value B in the above expression, the unit is also applied to the numerical value A.

<1. Metal Oxide Powder>

The metal oxide powder according to the first aspect of the present invention will be described.

A metal element to form a metal oxide is not particularly limited as long as it forms an oxide stable at ordinary temperature and pressure in the atmosphere. Specific examples of the metal oxide are: single oxides such as silica (silicon dioxide), alumina, titania, zirconia, magnesia (MgO), iron oxide, copper oxide, zinc oxide, tin oxide, tungsten oxide, and vanadium oxide; and multiple oxides containing two or more metal elements (for example, silica-alumina, silica-titania, silica-titania-zirconia, etc.). As for the multiple oxides, the single oxides therein may contain, as a constituent metal element, an alkali metal or an alkaline earth metal (the fourth period (Ca) of the periodic table and elements of the subsequent periods), which is relatively sensitive to water.

Among the metal oxides that can be used in the present invention, silica or a multiple oxide containing silica as the main component thereof is preferred since they are light and thus can have smaller bulk density and since they are inexpensive and easily available. The expression "a multiple oxide containing silica as the main component thereof" means that a molar ratio of silicon (Si) in a group of elements other than oxygen contained in the multiple oxide is no less than 50% and less than 100%. The molar ratio is preferably no less than 65%, more preferably no less than 75%, and still more preferably no less than 80%. When the multiple oxide containing silica as the main component thereof is used, preferred examples of a metal element contained therein other than silicon include: metals in Group II of the periodic table such as magnesium, calcium, strontium, and barium; metals in Group III of the periodic table such as aluminum, yttrium, indium, boron, and lanthanum (herein boron is regarded as a metal element); and metals in Group IV of the periodic table such as titanium, zirconium, germanium, and tin. Among them, Al, Ti, and Zr are especially preferred. The multiple oxide containing silica as the main component thereof may contain two or more metal elements other than silicon.

The metal oxide powder of the present invention has BET specific surface area of 400 to 1000 m$^2$/g, preferably 400 to 850 m$^2$/g. A larger specific surface area means a smaller particle size of a primary particle constituting a porous structure (mesh structure) of the independent particle of the metal oxide powder. Accordingly, a larger BET specific surface area makes it possible to form a framework structure of the metal oxide powder particle with a smaller amount of metal oxide, and therefore is preferable in improving the thermal insulation performance. When the specific surface area is smaller than the above range, excellent thermal insulation performance cannot be ensured. On the other hand, it is difficult to obtain a metal oxide powder having BET specific surface area beyond the above range.

As noted above, the BET specific surface area is determined by: drying a sample for measurement at a temperature of 200° C. for no less than three hours under a reduced pressure of no more than 1 kPa; thereafter measuring an adsorption isotherm of only nitrogen adsorption side at liquid nitrogen temperature; and analyzing the adsorption isotherm by BET method.

The metal oxide powder of the present invention has BJH pore volume of 2 to 8 mL/g. The lower limit of the BJH pore volume is preferably no less than 2.5 mL/g and more preferably no less than 4 mL/g. The upper limit thereof is preferably no more than 6 mL/g. When the pore volume is no more than 2 mL/g, excellent thermal insulation performance cannot be ensured. On the other hand, it is difficult to obtain a metal oxide powder having BJH pore volume of greater than 8 mL/g.

In the present invention, the BJH pore volume of the metal oxide powder is determined by obtaining the adsorption isotherm in the same manner as in the measurement of the BET specific surface area and analyzing it by BJH method. The pore measured by this method has a radius of 1 to 100 nm, and an integrated value of the volume of the pore in this range becomes the pore volume in the present invention.

A notable point of the metal oxide powder of the present invention is that it has an oil absorption of no less than 250 mL/100 g. That is, compared to ordinary aerogels having an oil absorption of about 210 mL/100 g at most, the metal oxide powder of the present invention has a very large oil absorption. The oil absorption of the metal oxide powder of the present invention is more preferably no less than 270 mL/100 g and especially preferably no less than 300 mL/100 g. Although the upper limit of the oil absorption is not particularly limited, it is preferably no more than 500 mL/100 g and more preferably no more than 400 mL/100 g in view of the particle strength (the decrease rate of the bulk density upon application of pressure). In the present invention, the oil absorption is measured by the method described in JIS K5101-13-1 "Refined Linseed Oil Method".

A factor for such a high oil absorption of the metal oxide powder of the present invention as above is that the independent particles constituting the metal oxide powder of the present invention are hollow particles having therein one or more large void (i.e. hollow space) with a diameter of usually about 0.5 to 15 μm and often about 1 to 10 μm, which cannot be measured by the BJH measurement method of a pore volume described above.

Ordinary aerogel powders do not have such a void. Therefore, a value of a ratio r of the oil absorption to the BJH pore volume determined by the formula (2) (which is shown again below):

[Mathematical Formula 3]

$$r = \frac{A}{100B} \quad (2)$$

(In the formula (2), A represents oil absorption [mL/100 g]. B represents BJH pore volume [mL/g].)

is about 0.5 at most in the ordinary aerogel powders.

By contrast, since the metal oxide powder of the present invention is constituted by hollow particles as described above, the hollow space (large void) therein as well as pores having such a size as measurable by BJH method (namely, mesopores) absorb oil. Accordingly, the metal oxide powder of the present invention is likely to have a high ratio of the oil absorption to the BJH pore volume. In other words, the ratio between the oil absorption and the BJH pore volume (oil absorption/BJH pore volume) can be used as an indicator to judge whether the particles have therein a large void (hollow space) described above. In the metal oxide powder of the present invention, the ratio between the oil absorption and the pore volume (oil absorption/pore volume) (r in the above formula (2)) is preferably no less than 0.70, more preferably no less than 0.75, still more preferably no less than 0.80, and especially preferably no less than 0.85. In view of ensuring the particle strength, the ratio is preferably no more than 1.50 and more preferably no more than 1.30.

In general, a shape of the void in the metal oxide powder of the present invention is substantially globular. Sometimes, there are two or more voids in one particle.

A further characteristic point of the metal oxide powder of the present invention is that the powder having such properties as described above has globular independent particles as the main component. Some silica by gel method and wet silica powder, which are conventionally known, have an oil absorption of about 400 mL/100 g at maximum. However, some of the conventional silica has irregular secondary particles formed by strong agglomeration of primary particles and is not mainly composed of globular independent particles, as the metal oxide powder of the present invention is.

Since the metal oxide powder of the present invention also has the characteristic particle shape in this manner, it shows far more excellent fluidity in the powder form, compared to the powder having a high oil absorption such as conventionally known wet silica. When the metal oxide powder of the present invention is used as a thermal insulator, excellent thermal insulation can be attained since heat is less likely to transfer because of a smaller number of contact points between the particles.

An average particle circularity by image analysis method of the particles constituting the metal oxide powder of the present invention is preferably no less than 0.80 and more preferably no less than 0.85. The "average particle circularity by image analysis method" is an arithmetic mean of circularity obtained by image analysis of the SEM image of no less than 2000 powder particles observed by secondary electron detection at a low acceleration voltage (1 kV to 3 kV) and a magnification of 1000 using SEM. The "circularity" of each particle is a value C determined by the formula (1) (which is shown again below). A group of particles forming one agglomerated particle is counted as one particle.

[Mathematical Formula 4]

$$C = \frac{4\pi S}{L^2} \quad (1)$$

(In the formula (1), S represents an area (projected area) of the particle in the image. L represents a length of an outer periphery (perimeter) of the particle in the image.)

As the average circularity goes larger than 0.80 to be closer to 1, the shape of the powder particles constituting the metal oxide powder becomes closer to a spherical shape. Accordingly, the metal oxide powder has a smaller contact area between the particles constituting it, and is likely to exhibit excellent thermal insulation performance when it is used as a core material of vacuum thermal insulators.

Although the particle size of each of the particles constituting the metal oxide powder of the present invention is not particularly defined, an average particle size thereof is preferably in a range of from 1 to 20 μm, and more preferably in a range of from 5 to 15 μm, in view of making the metal oxide powder easy to manufacture and handle and in view of the thermal insulation performance thereof when it is used as a thermal insulator. The average particle size in this range makes it possible to form a void of adequate size between the particles, leading to excellent thermal insulation performance in the application of the metal oxide powder as a core material of vacuum thermal insulators.

The above average particle size is an arithmetic mean of equivalent circle diameters obtained by image analysis of the SEM image of no less than 2000 powder particles observed by secondary electron detection at a low acceleration voltage (1 kV to 3 kV) and a magnification of 1000 using SEM. The "equivalent circle diameter" of each particle is a diameter of a circle having an area equal to the area (projected area) of the particle in the image. A group of particles forming one agglomerated particle is counted as one particle.

The metal oxide powder of the present invention has preferably been hydrophobized. It is of great use to employ the hydrophobized metal oxide powder of the present invention as a vacuum thermal insulator since it absorbs little water, which causes degradation thereof with time. It is also preferable that the metal oxide powder of the present invention have been hydrophobized, in view of being able to manufacture it without carrying out the supercritical drying. A specific example of the manner in which the metal oxide powder of the present invention has been hydrophobized is that it has been treated with a hydrophobing agent.

Whether the metal oxide powder of the present invention has been hydrophobized or not can be checked very easily for example by putting the powder and pure water together in a container and stirring a resultant mixture thereof. When the metal oxide powder has been hydrophobized, it will not be dispersed in the water, and when the mixture is left standing, there will be two separated layers again with the water in the lower layer and the powder in the upper layer.

A carbon content can also be used to show that the metal oxide powder of the present invention has been hydrophobized. The carbon content in the metal oxide powder can be measured by quantifying the amount of carbon dioxide produced in an oxidation treatment thereof in the air or in oxygen at a temperature of about 1000 to 1500° C.

The carbon content in the metal oxide powder of the present invention is preferably 6 to 12 mass % and more preferably 7 to 12 mass %. Since degradation of the metal oxide powder that is caused by water absorption can be inhibited more effectively by hydrophobizing it so as to make the carbon content no less than 6 mass %, the stability with time of the metal oxide powder in the application as a core material of vacuum thermal insulators can be more favorable. On the other hand, it is difficult to obtain, by a general hydrophobizing treatment, a metal oxide powder having a carbon content of greater than 12 mass % while maintaining the above properties of the metal oxide powder of the present invention.

Figure 2:
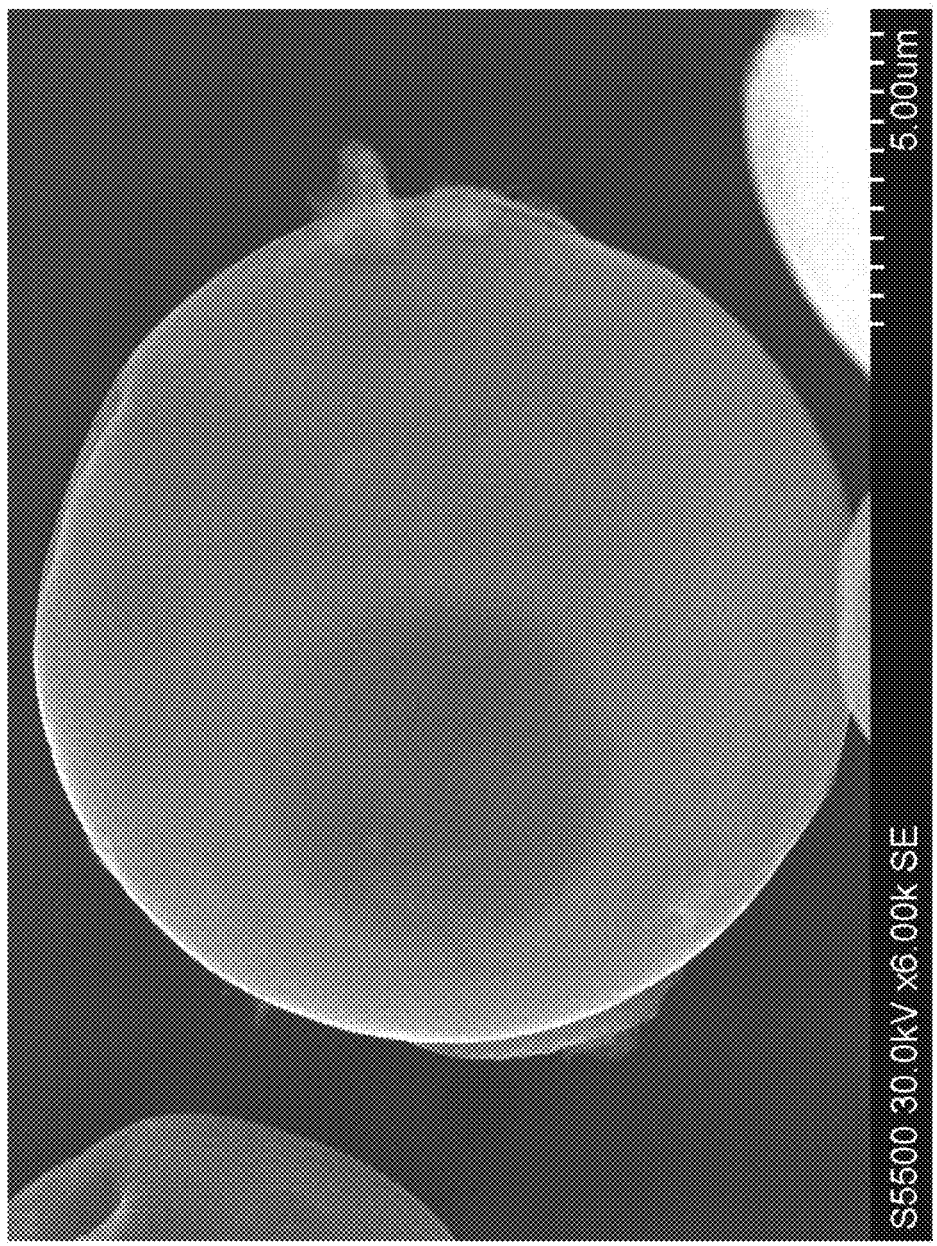
FIG. 2 is an SEM image, taken at an acceleration voltage of 30.0 kV, of the independent particle constituting the metal oxide powder of the present invention produced in Example 1.
Figure 3:
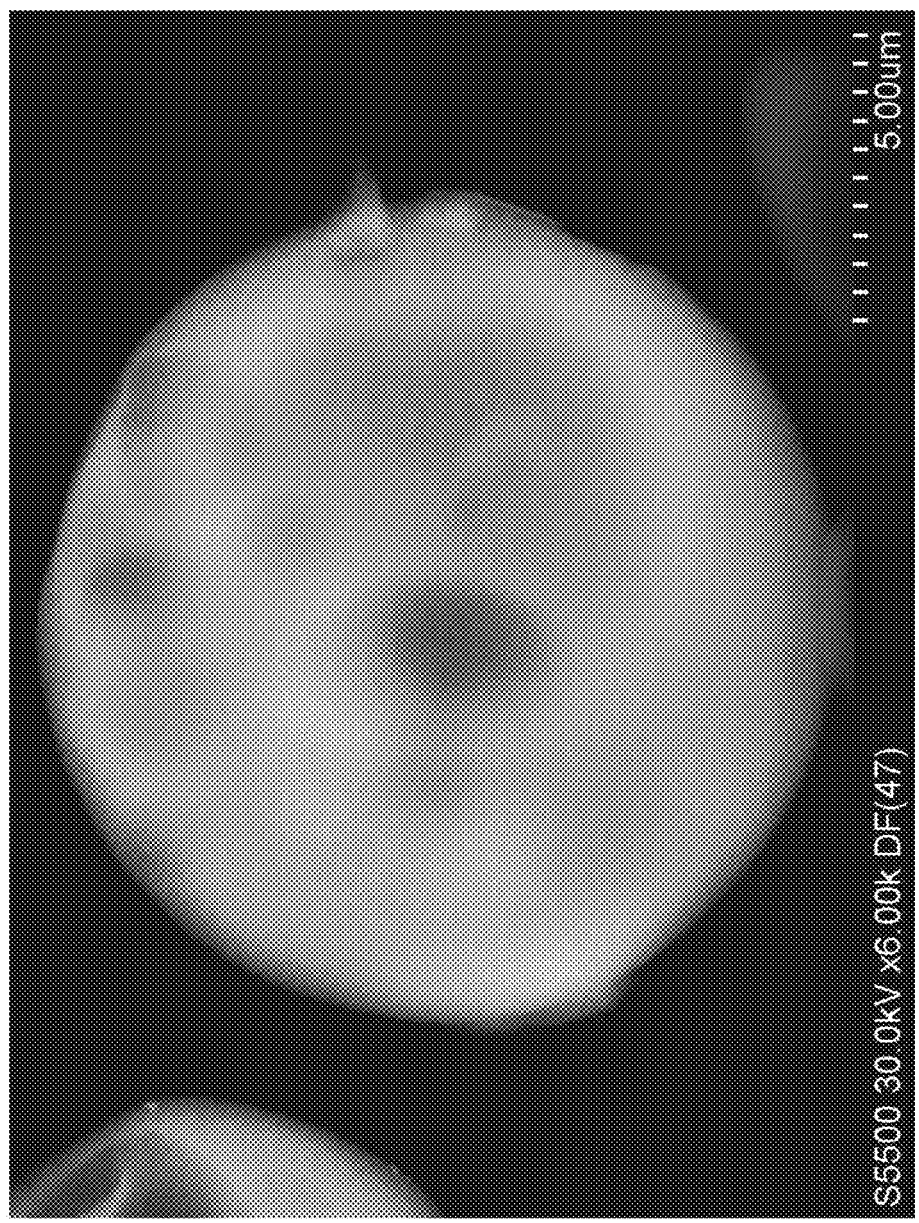
FIG. 3 is a scanning transmission electron microscope (STEM) image, taken at an acceleration voltage of 30.0 kV, of the independent particle constituting the metal oxide powder of the present invention produced in Example 1.
Figure 4:
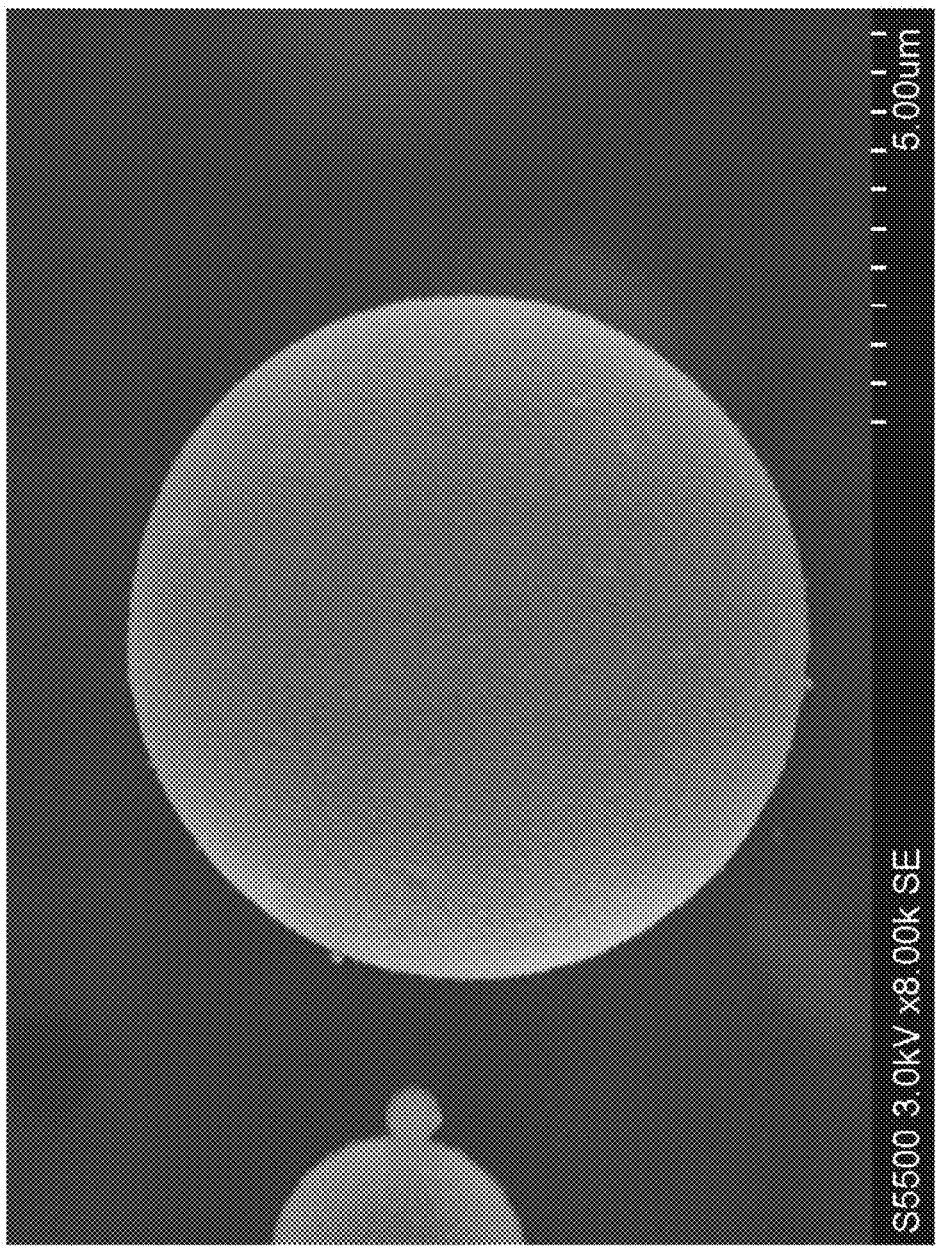
FIG. 4 is an SEM image, taken at an acceleration voltage of 3.0 kV, of an independent particle constituting a metal oxide powder produced in Comparative Example 1.
Figure 5:
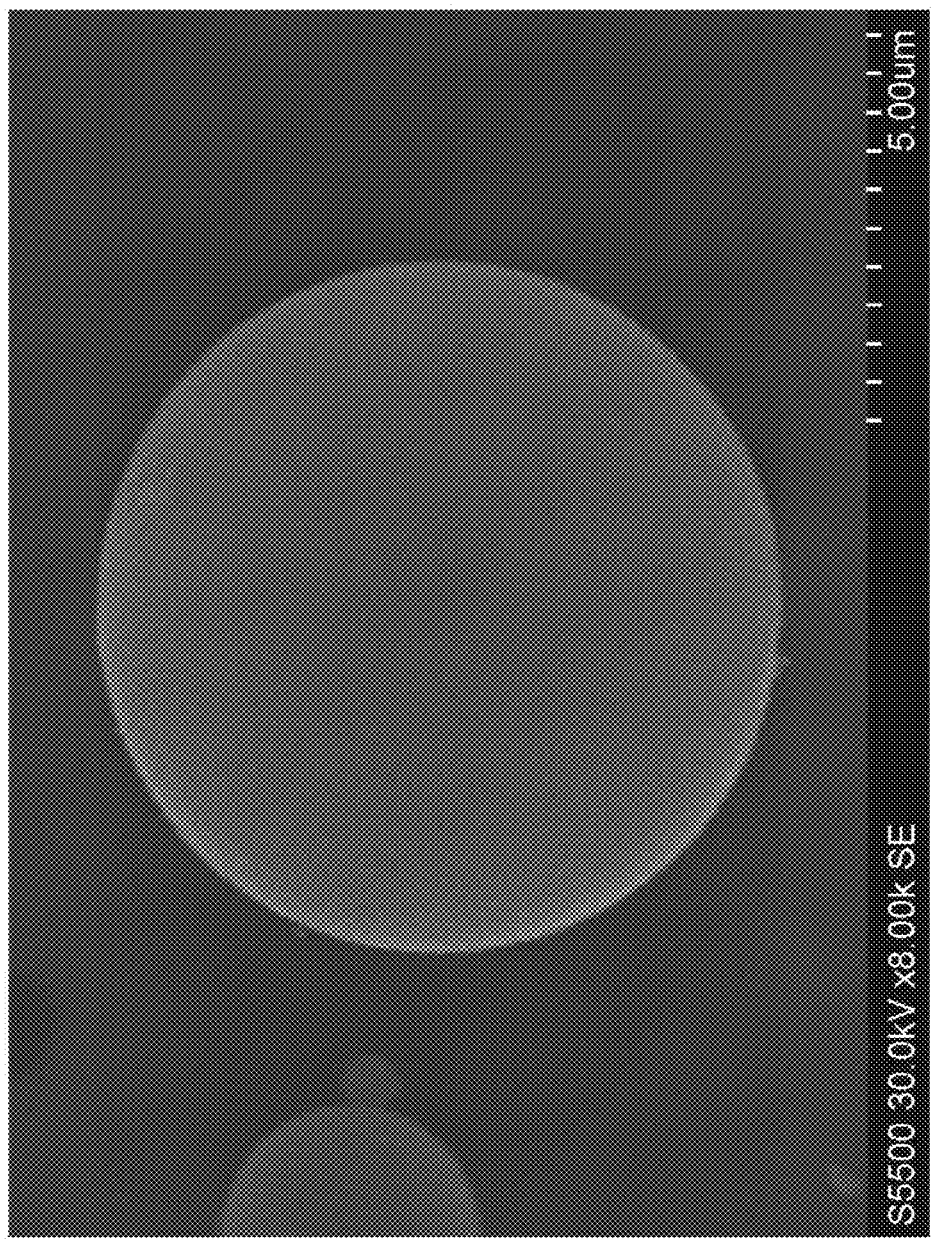
FIG. 5 is an SEM image, taken at an acceleration voltage of 30.0 kV, of the independent particle constituting the metal oxide powder produced in Comparative Example 1.
Figure 6:
FIG. 6 is an STEM image, taken at an acceleration voltage of 30.0 kV, of the independent particle constituting the metal oxide powder produced in Comparative Example 1.

The existence of the void in the particles of the metal oxide powder of the present invention can be roughly identified by the ratio of oil absorption/pore volume as described above. However, it can also be confirmed directly by observing the particles by SEM or a transmission electron microscope (TEM). It can also be confirmed by observing a dark-field image (DF-STEM image) by a scanning transmission electron microscope (STEM). In confirming the existence of the void by SEM, secondary electron detection images with varying acceleration voltage can be compared. For example, when the acceleration voltage is 3.0 kV, an image highlighting a surface of the particle can be obtained (FIGS. 1 and 4). When the acceleration voltage is 30.0 kV, an image highlighting an internal structure of the particle can be obtained (FIGS. 2 and 5). Namely, since a hollow space that cannot be observed with the acceleration voltage of 3.0 kV can be observed when the acceleration voltage is 30.0 kV, the hollow space can be identified by comparing both of the images. Since a contrast difference between the area with a hollow space and the area without a hollow space is shown in the dark-field image in the observation by STEM, the existence of the hollow space can be identified by the contrast difference in the STEM image (FIGS. 3 and 6).

A method for manufacturing the metal oxide powder of the present invention having the properties described above is not particularly limited, but according to the inventors' study, the metal oxide powder of the present invention can be preferably manufactured by the method described below.

<2. Method for Manufacturing Hollow and Globular Shaped Metal Oxide Powder>

The metal oxide powder of the present invention can be manufactured by forming an O/W/O emulsion wherein an aqueous metal oxide sol composes the W phase of the O/W/O emulsion, and thereafter causing gelation of the metal oxide sol in the O/W/O emulsion.

Figure 7:
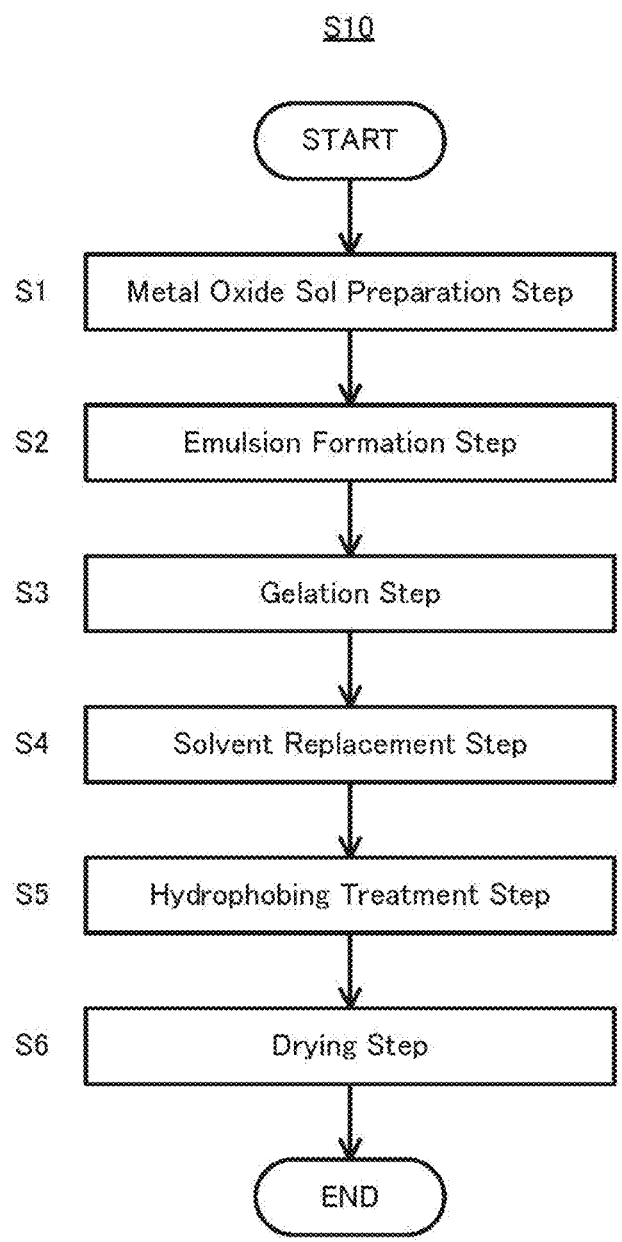
FIG. 7 is a flowchart illustrating one embodiment of the method for manufacturing a hollow shaped metal oxide powder according to the second aspect of the present invention.

FIG. 7 is a flowchart illustrating a method S10 for manufacturing a hollow and globular shaped metal oxide powder (hereinafter sometimes referred to as a "manufacturing method S10" or simply "S10"). The manufacturing method S10 exemplifies one preferable embodiment of the manufacturing method according to the second aspect of the present invention. As shown in FIG. 7, the manufacturing method S10 includes the successive steps (i) to (vi) below:

(i) preparing an aqueous metal oxide sol (Metal Oxide Sol Preparation Step S1);

(ii) forming an O/W/O emulsion wherein the aqueous metal oxide sol composes the W phase of the O/W/O emulsion (Emulsion Formation Step S2);

(iii) causing gelation of the aqueous metal oxide sol, thereby converting the O/W/O emulsion into a dispersion of a gel (Gelation Step S3);

(iv) replacing water in the dispersion with a solvent which has a surface tension at 20° C. of no more than 30 mN/m (Solvent Replacement Step S4);

(v) treating the gel with a hydrophobing agent (Hydrophobing Treatment Step S5); and (vi) removing the solvent used in the replacing step (iv) (Drying Step S6).

(Metal Oxide Sol Preparation Step S1)

The metal oxide sol preparation step S1 (hereinafter sometimes referred to as "S1") may be carried out by appropriately selecting a known method of preparing an aqueous metal oxide sol. Examples of a source material for making the metal oxide sol include: metal alkoxides; alkali metal salts of metal oxo acids such as alkali metal silicates; and various water-soluble metal salts such as water-soluble salts of inorganic acids or organic acids.

Specific examples of the metal alkoxides that can be preferably used in the present invention include tetramethoxysilane, tetraethoxysilane, triethoxyaluminum, triisopropoxyaluminum, tetraisopropoxytitanium, tetrabutoxytitanium, tetrapropoxyzirconium, and tetrabutoxyzirconium.

Examples of the alkali metal salts of metal oxo acids that can be preferably used in the present invention include alkali metal silicates such as potassium silicate and sodium silicate; and the chemical formula of the alkali metal silicates is represented by the following formula (3).

[Chemical Formula 1]

$$m(M_2O).n(SiO_2) \quad (3)$$

(In the formula (3), m and n independently represent a positive integer, and M represents an alkali metal element.)

Other examples of the alkali metal salts of metal oxo acids that can be used in the present invention include alkali metal salts, preferably sodium salt and potassium salt, of metal oxo acids such as aluminic acid, vanadic acid, titanic acid and tungstic acid.

Examples of the water-soluble metal salts of inorganic acids or organic acids that can be preferably used in the present invention include iron chloride (III), zinc chloride, tin chloride ((II) or (IV)), magnesium chloride, copper chloride (II), magnesium nitrate, zinc nitrate, calcium nitrate, barium nitrate, strontium nitrate, iron nitrate (III), copper nitrate (II), magnesium acetate, calcium acetate, and vanadium chloride (IV).

Among the source materials for preparing the metal oxide sol described above, alkali metal silicates can be preferably employed since they are inexpensive, and sodium silicate, which is easily available, is preferred. Hereinafter, an embodiment will be shown as a typical example in which sodium silicate is used as a source material for preparing a metal oxide sol and silica is produced as a metal oxide. Even when other metal sources are used, though, the metal oxide powder of the present invention can be produced likewise by preparing an aqueous sol and causing gelation of the sol by a known method.

In the case of using an alkali metal silicate such as sodium silicate, a silica sol can be prepared by neutralizing the alkali metal silicate by a mineral acid such as hydrochloric acid or sulfuric acid, or replacing alkali metal atoms in the alkali metal silicate with hydrogen atoms by using a cation exchange resin having a proton ($H^+$) as a counter ion (hereinafter this type of cation exchange resin is sometimes referred to as an "acid type cation exchange resin").

As the method of preparing the silica sol through neutralization by an acid, adding an aqueous solution of an alkali metal silicate to an aqueous solution of an acid while stirring the aqueous solution of the acid, or mixing an aqueous solution of an acid with an aqueous solution of an alkali metal silicate by collision in a piping (see Japanese Examined Patent Application Publication No. H4-54619, for example), can be raised. The amount of acid used is preferably 1.05 to 1.2 as a molar ratio of a proton with respect to an alkali metal of the alkali metal silicate. With the amount of acid in this range, the pH of the silica sol becomes about 1 to 3.

Preparation of the silica sol by using the acid type cation exchange resin can be performed by a known method. For example, the method may be: making an aqueous solution of an alkali metal silicate having a proper concentration pass through a tower filled with the acid type cation exchange resin; or adding the acid type cation exchange resin to an aqueous solution of an alkali metal silicate to mix them, thereby making alkali metal ions be chemically adsorbed onto the cation exchange resin to be removed from the solution, and thereafter separating off the acid type cation exchange resin by filteration or the like. When preparing the silica sol using the acid type cation exchange resin, the amount of acid type cation exchange resin used needs to be no less than the amount that allows exchange of the alkali metal contained in the solution.

A known acid type cation exchange resin may be employed as the acid type cation exchange resin described above without particular limitations. For example, it may be selected from ion exchange resins such as styrene-based, acrylic, and methacrylic ones having sulfo groups or carboxyl groups as ion exchange groups. Among them, the strong acid type cation exchange resins having sulfo groups may be favorably employed.

The acid type cation exchange resin described above can be regenerated by a known method, for example, by making the resin contact with sulfuric acid or hydrochloric acid, after the resin is used for exchanging the alkali metal. The amount of acid used for the regeneration is usually twice to ten times more than the exchange capacity of the ion exchange resin.

The concentration of the silica sol prepared by the above method is preferably no less than 50 g/L as silica concentration (concentration in terms of $SiO_2$), since such concentration makes it possible to complete gelation of the silica sol in relatively short time and to inhibit shrinkage of the gel upon drying with sound formation of the framework structure of the silica particle and thereby easily obtain the silica particle with a large pore volume. On the other hand, the concentration is preferably no more than 160 g/L and more preferably no more than 100 g/L or less, since such concentration makes it possible to reduce heat transfer (solid conduction) by the silica framework itself by relatively reducing the density of the silica particle and thereby easily attain favorable thermal insulation performance.

(Emulsion Formation Step S2)

The emulsion formation step S2 (hereinafter, sometimes simply referred to as S2) is the step of forming an O/W/O emulsion wherein the aqueous metal oxide sol (silica sol, herein) afforded by S1 composes the W phase of the O/W/O emulsion. Although a known method may be appropriately selected to form the O/W/O emulsion, a preferred example of the method is as follows. That is, it is preferable to form an O/W emulsion (an emulsion having liquid droplets dispersed in the water phase) first. The O/W emulsion can be formed by dispersing a liquid (first O phase) immiscible with water into the sol.

Examples of the liquid immiscible with water include hydrocarbons and halogenated hydrocarbons, such as hexane, heptane, octane, nonane, decane, dichloromethane, chloroform, carbon tetrachloride, and dichloropropane. Among them, hexane, which has moderate viscosity, is especially preferred.

It is preferable to add a surfactant when forming the O/W emulsion described above. The surfactant to be used may be selected from anionic surfactants, cationic surfactants, and nonionic surfactants. A surfactant which has an HLB of about 10 to 15 can be favorably employed, the HLB indicating the degree of hydrophilicity and hydrophobicity of the surfactant. In the present invention, the "HLB" refers to an HLB value by Griffin's method. Specific examples of the surfactant include polyoxyethylene sorbitan monostearate, polyoxyethylene sorbitan monooleate, and polyoxyethylene sorbitan monopalmitate. Nonionic surfactants are preferred since they enable the above O/W emulsion having the W phase and the O phase to be formed easily. The amount of surfactant used is the same as an amount usually employed to form an O/W emulsion, and specifically it may be about 0.05 to 5 weight %.

A known method of forming an O/W emulsion can be adopted to disperse the liquid immiscible with water into the sol when forming the O/W emulsion described above. In specific, a mixer, a homogenizer, or the like may be used. A homogenizer can be preferably employed. The particle size of the O phase dispersed generally corresponds to the particle size of the void present in the metal oxide particle described above. Therefore, the dispersion strength and the dispersion time may be adjusted so as to make a desired particle size. As noted above, the particle size of the O phase is preferably 0.5 to 15 μm, and especially preferably 1 to 10 μm.

To produce the metal oxide gel of the present invention by this method, an O/W/O emulsion is formed using a solvent (second O phase) immiscible with the W phase of the O/W emulsion, following formation of the O/W emulsion. In this case as well, a surfactant is preferably further added, in addition to the solvent.

Examples of the solvent to be used herein include hexane, heptane, octane, nonane, decane, dichloromethane, chloroform, carbon tetrachloride, and dichloropropane.

The surfactant to be used may be selected from anionic surfactants, cationic surfactants, and nonionic surfactants. A surfactant which has an HLB of about 4 to 6 can be favorably employed, the HLB indicating the degree of hydrophilicity and hydrophobicity of the surfactant. Specific examples of the surfactant include sorbitan monooleate, sorbitan monostearate, and sorbitan monosesquioleate. Nonionic surfactants are preferred since they enable the above O/W/O emulsion having the W phase and the two O phases to be formed easily. The amount of surfactant used is the same as an amount usually employed to form a W/O emulsion (an emulsion having water droplets dispersed in the oil phase), and specifically may be about 0.05 to 5 weight %.

The known method of forming an O/W emulsion described above may be adopted to disperse the sol into the liquid immiscible with water when forming the O/W/O emulsion. The particle size of the sol (W phase) dispersed generally corresponds to the particle size of the particle constituting the metal oxide powder of the present invention manufactured. Therefore, the dispersion strength and the dispersion time may be adjusted so as to make a desired particle size. That is, the average particle size of the sol is preferably in a range of from 1 to 20 and more preferably in a range of from 5 to 15 µm.

(Gelation Step S3)

In the manufacturing method S10, gelation of the sol is caused (gelation step S3, hereinafter sometimes simply referred to as "S3") after the O/W/O emulsion is formed by the above procedure. A known gelation method may be adopted without particular limitations to cause the gelation as long as the O/W/O state is not destroyed.

A first preferable method is for example adjusting, when forming the sol, the pH of the sol in advance so that it will take some time before the gelation occurs. That is, at the time of forming the metal oxide sol described above, the pH is adjusted such that the gelation will not occur during formation of the O/W/O emulsion but will be caused by having the emulsion kept for about 30 minutes at a certain temperature after formation of the emulsion. In specific, in a case of carrying out each of the steps at room temperature, the pH is preferably in a range of from 3 to 5, and more preferably in a range of from 3 to 4.5 if the silica concentration is in the range described above.

A second preferable method is for example adding a basic substance to the O/W/O emulsion to thereby increase the pH of the W phase and make the emulsion weakly acidic to basic. In this case, it is preferable to adjust the pH of the sol to be relatively low (about 0.5 to 2.5), which allows the sol to be stable, when preparing the sol. A specific way to increase the pH of the W phase is preferably determining in advance the amount of base that allows the W phase to have a desired pH and adding the base in that amount to the O/W/O emulsion. The amount of base that allows the desired pH can be determined by separating a certain amount of sol to be used for the O/W/O emulsion, adding a base for the gelation to the sol separated while measuring by a pH meter the pH of the sol separated, and measuring the amount of base that has led to the desired pH. When adding a basic substance to the O/W/O emulsion, it is preferable to stir the emulsion using a mixer and the like to thereby prevent the pH from increasing locally in a disproportionate manner (i.e. local pH increase) as much as possible. Examples of the basic substance include ammonia, sodium hydroxide, and alkali metal silicates.

Although the time needed to cause the gelation described above depends on the temperature or the concentration of the silica sol, gelation occurs in several minutes when the pH is 5, the temperature is 50° C., and the silica concentration (in terms of $SiO_2$) in the silica sol is 80/L.

In view of making the particles constituting the metal oxide powder of the present invention have high strength, it is preferable to perform aging for about 0.5 to 24 hours after the gelation to thereby make the gelation reaction (dehydration condensation reaction) proceed further. The aging can be performed by holding the gel at about room temperature to 80° C.

(Solvent Replacement Step S4)

To manufacture the metal oxide powder of the present invention, the gel produced may be separated from the solvent used in forming the O/W/O emulsion and dried, after the gelation is caused. In order to maintain the high specific surface area and the high pore volume that are characteristic to the metal oxide powder of the present invention, the gel needs to be separated in a way that the framework of the metal oxide formed upon gelation is maintained.

As an example of the separation and drying method, replacement and drying of the dispersion medium of the gel by a supercritical fluid (e.g. carbon dioxide) can be raised. However, in view of costs of an apparatus and so on, it is preferable to replace the dispersion medium of the gel with a solvent having a small surface tension and then remove/dry the solvent. In a case of adopting the latter method, it is especially preferable to hydrophobize the surface of the particle with a hydrophobing agent in order to prevent agglomeration of the particles upon drying. An embodiment of the manufacturing method S10 which adopts the latter method, that is, replacing the dispersion medium with a solvent having a small surface tension and thereafter removing the solvent, will be described in detail. Herein, the "small surface tension" specifically means that a surface tension ($\gamma$) at 20° C. is no more than 30 mN/m. It is preferably no more than 25 mN/m, and especially preferably no more than 20 mN/m.

The replacement with a solvent having a small surface tension (solvent replacement step S4, hereinafter simply referred to as "S4") is to replace water used until formation of the gel (and the solvent composing the O phase, as necessary) with a solvent having a small surface tension before drying the gel afforded by S1 to S3 described above, so as to prevent drying shrinkage of the gel.

When the silica sol has been afforded by neutralization by a mineral acid, it is preferable to wash the gel before carrying out the solvent replacement. In specific, the gel is washed by (1) adding a certain amount of solvent compatible with both water and the solvent used to form the O phase, such as acetone, to a dispersion of the gel or to the gel separated from the dispersion by filtration, centrifugal filtration, and the like (the gel is to be kept moist), (2) removing the non-aqueous solvent forming the O phase, and thereafter (3) washing the gel with a certain amount of water. The washing is performed to remove the salt in the gel by washing the gel with water. Therefore, when the silica sol has been prepared by using the acid-type cation exchange resin, the washing is unnecessary. To manufacture the metal oxide powder of the present invention, the washing is performed until the electrical conductivity of the washing liquid (i.e. washing water) becomes preferably no more than 100 µS/cm, more preferably no more than 50 µS/cm, and especially preferably no more than 40 µS/cm, in view of reducing the bulk density.

The washing of the gel may be performed by a known method. An example of the method is repeating the steps of: adding a certain amount of water to the gel; letting it stand for a certain time; and thereafter removing the washing water. Another example of the method is passing a certain amount of water through the gel put in a column. Still another example of the method is repeating the steps of: putting a certain amount of water and the gel together in a centrifuging tube; mixing them by shaking; separating them by centrifugation; and removing a supernatant. In the case of washing the gel using a column, the washing can be performed while applying pressure of about 0.2 MPa to 1.0 MPa to increase the flow rate, in order to improve the efficiency.

As noted above, to manufacture the metal oxide powder of the present invention, the solvent in the gel is replaced with a solvent having a small surface tension, but since it is difficult to replace water (water in the W phase and/or water used for the washing) directly with a solvent having a small surface tension, the solvent replacement is usually performed in two stages.

A criterion for selecting a solvent to use in the first stage is that the solvent is compatible with both water and a solvent to be used in the second stage of the solvent replacement (i.e. hydrophilic solvents). Examples of the solvent include methanol, ethanol, isopropyl alcohol, and acetone. Among them, ethanol can be preferably used.

A criterion for selecting a solvent to use in the second stage is that the solvent does not react with a treating agent used in the following hydrophobing treatment and has a small surface tension so as not to cause drying shrinkage. Examples of the solvent to use in the second stage include hexane, dichloromethane, methyl ethyl ketone, and toluene. Preferably, hexane and toluene can be used. Additional solvent replacement may also be performed between the first and the second stages of the solve replacement, if necessary.

The first stage of the solvent replacement may be performed by a known method. An example of the method is repeating the steps of: adding a certain amount of solvent to the gel; leaving it standing for a certain time; and thereafter removing the solvent. Another example of the method is passing a certain amount of solvent through the gel put in a column. Still another example of the method is repeating the steps of: putting a certain amount of solvent and the gel together in a centrifuging tube; mixing them by shaking; separating them by centrifugation; and removing a supernatant. In order to save the solvent used for the replacement, the method using a column is preferred. In the case of carrying out the replacement using a column, pressure of about 0.2 MPa to 1.0 MPa can be applied to increase the flow rate, in order to improve the efficiency.

The amount of solvent used in the first stage of the solvent replacement is preferably such an amount that water in the gel can be replaced sufficiently. The water content in the gel after the replacement is preferably no more than 10 mass parts per 100 mass parts of the silica content (in terms of $SiO_2$). In the case of adopting the method using a column, a solvent in an amount which is five to ten times more than the volume of the gel may be used. In the case of adopting the method using a centrifugal separator, a solvent in an amount which is six to ten times more than the volume of the gel may be used.

The solvent replacement in the second stage may also be performed in the same manner as in the first stage, and can be performed using such an amount of solvent that can sufficiently replace the solvent used in the first stage. In the case of adopting the method using a column, a solvent in an amount which is five to ten times more than the volume of the gel may be used. In the case of adopting the method using a centrifugal separator, a solvent in an amount which is six to ten times more than the volume of the gel may be used.

The solvents used for the above solvent replacement are preferably collected, purified by distillation etc., and thereafter reused, in order to save costs for the solvents.

(Hydrophobing Treatment Step S5)

In the method for manufacturing the metal oxide powder of the present invention, the gel is preferably treated with a hydrophobing agent (hydrophobing step S5, hereinafter sometimes simply referred to as "S5") after the solvent replacement described above. An example of the hydrophobing agent that can be used in the present invention is a silylating agent which is capable of reacting with a hydroxy group existing on the surface of the metal oxide (silica, herein):

[Chemical Formula 2]

(In the formula (4), M represents a metal atom. In the formula (4), the remaining valences of M are omitted.)

thereby converting the hydroxy group into:

[Chemical Formula 3]

(In the formula (5), n is an integer of 1 to 3; each R is independently a hydrocarbyl group; and two or more R may be the same or different from each other where n is 2 or more.)

Carrying out the hydrophobing treatment by using such a hydrophobing agent causes the hydroxy group on the surface of the metal oxide (silica, herein) to be endcapped by a hydrophobic silyl group and deactivated, and therefore makes it possible to inhibit dehydration condensation reaction between the hydroxy groups on the surface. Thus, drying shrinkage can be inhibited even when drying is performed under conditions which fall short of the critical point, and therefore an aerogel having a BJH pore volume of no less than 2 mL/g and an oil absorption of no less than 250 mL/100 g can be obtained.

Compounds represented by the following formulae (6) to (8) are known as silylating agents that can be used as such hydrophobing agents as described above.

[Chemical Formula 4]

(In the formula (6), n represents an integer of 1 to 3; R represents a hydrophobic group such as a hydrocarbyl group; X represents a group (i.e. a leaving group) which can leave a molecule by cleavage of bond with the Si atom in a reaction with a compound having a hydroxy group; each R may be the same or different where n is 2 or more; and each X may be the same or different where n is 2 or less.)

[Chemical Formula 5]

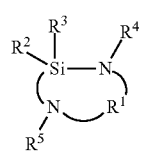

(In the formula (7), $R^1$ represents an alkylene group; $R^2$ and $R^3$ independently represent a hydrocarbyl group; and $R^4$ and $R^5$ independently represent a hydrogen atom or a hydrocarbyl group.)

[Chemical Formula 6]

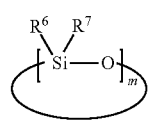

(In the formula (8), $R^6$ and $R^7$ independently represent a hydrocarbyl group; m represents an integer of 3 to 6; each $R^6$ may be the same or different when there are two or more $R^6$; and each $R^7$ may be the same or different when there are two or more $R^7$.)

In the above formula (6), R is a hydrocarbyl group, preferably a hydrocarbyl group having a carbon number of 1 to 10, more preferably a hydrocarbyl group having a carbon number of 1 to 4, and especially preferably a methyl group.

Examples of the leaving group represented by X include: halogen atoms such as chlorine and bromine; alkoxy groups such as a methoxy group and an ethoxy group; groups represented by —NH—SiR$_3$ (wherein definition of R is the same as that of R in the formula (6)).

Specific examples of the hydrophobing agent represented by the above formula (6) include: chlorotrimethylsilane, dichlorodimethylsilane, trichloromethylsilane, monomethyltrimethoxysilane, monomethyltriethoxysilane, and hexamethyldisilazane. In view of favorable reactivity, chlorotrimethylsilane, dichlorodimethylsilane, trichloromethylsilane, and hexamethyldisilazane are especially preferred.

The number of bond of the Si atom with the hydroxyl group on the framework of the metal oxide varies depending on the number (4-n) of the leaving group X. For example, if n is 2, the following bonding will occur:
[Chemical Formula 7]

$$(M-O-)_2SiR_2 \qquad (9)$$

If n is 3, the following bonding will occur:
[Chemical Formula 8]

$$M-O-SiR_3 \qquad (10)$$

In this way, the hydroxyl group is silylated, and thereby hydrophobization is done.

In the above formula (7), $R^1$ is an alkylene group, preferably an alkylene group having a carbon number of 2 to 8, and especially preferably an alkylene group having a carbon number of 2 to 3.

In the above formula (7), $R^2$ and $R^3$ are independently a hydrocarbyl group, and the same preferable groups as those of R in the formula (6) can be raised. $R^4$ represents a hydrogen atom or a hydrocarbyl group, and when it is a hydrocarbyl group, the same preferable groups as those of R in the formula (6) can be raised. If the gel is treated with the compound (cyclic silazane) represented by the formula (7), cleavage of Si—N bonds will occur by the reaction with the hydroxyl groups, and therefore the following bonding will occur on the surface of the framework of the metal oxide (silica, herein) in the gel:
[Chemical Formula 9]

$$(M-O-)_2SiR^2R^3 \qquad (11)$$

In this way, the hydroxyl group is silylated by the cyclic silazanes of the above formula (7) as well, and thereby hydrophobization is done.

Specific examples of the cyclic silazanes represented by the above formula (7) include hexamethylcyclotrisilazane, and octamethylcyclotetrasilazane.

In the above formula (8), $R^6$ and $R^7$ are independently a hydrocarbyl group, and the same preferable groups as those of R in the formula (6) can be raised. m represents an integer of 3 to 6. When the gel is treated with the compound (cyclic siloxane) represented by the formula (8), the following bonding will occur on the surface of the metal oxide framework in the gel:
[Chemical Formula 10]

$$(M-O-)_2SiR^6R^7 \qquad (12)$$

In this way, the hydroxyl group is silylated by the cyclic siloxanes of the above formula (8) as well, and thereby hydrophobization is done.

Specific examples of the cyclic siloxanes represented by the above formula (8) include hexamethylcyclotrisiloxane, octamethylcyclotetrasiloxane, and decamethylcyclopentasiloxane.

Although, in the above descriptions, the silylation agents have been mainly described as examples of the hydrophobing agent, the hydrophobing agent that can be used in the present invention is not limited to the silylating agents. Titanate coupling agents or aluminate coupling agents may also be employed.

The amount of the hydrophobing agent used in the hydrophobing treatment depends on the type of the hydrophobing agent, but when the metal oxide is silica and dichlorodimethylsilane is used as the hydrophobing agent for example, the amount of dichlorodimethylsilane is preferably 30 to 150 weight parts per 100 weight parts of the metal oxide (silica).

As for the conditions of the hydrophobing treatment described above, the hydrophobization can be performed by adding a certain amount of solvent to a dispersion containing the gel that has been subjected to the solvent replacement described above, thereafter adding a hydrophobing agent thereto, and keeping them reacting for a certain time. For example, when the metal oxide is silica, dichlorodimethylsilane is used as the hydrophobing agent, and the treating temperature is 50° C., the hydrophobization can be completed after the dispersion is kept for no less than about 4 to 12 hours.

(Drying Step S6)

To obtain the metal oxide powder of the present invention, the gel is separated by flitration after the hydrophobing treatment in S5 above, the hydrophobing agent unreacted is washed with a solvent (a solvent having a small surface tension), and thereafter the solvent is removed (that is, dried) (drying step S6, hereinafter sometimes simply referred to as "S6"). The drying temperature is preferably no less than the boiling point of the solvent and no more than the decomposition temperature of the hydrophobing agent. The drying is preferably performed under atmospheric pressure or under reduced pressure.

In the manufacturing method S10, the metal oxide powder of the present invention can be obtained through S1 to S6 described above.

In the above descriptions on the present invention, the metal oxide powder having silica as the metal oxide and the method for manufacturing the hollow and globular shaped metal oxide powder have been mainly explained, but the present invention is not limited to these embodiments.

For example, in a case of attempting to obtain the metal oxide of the present invention which is made of a silica-titania multiple oxide by a method using the metal alkoxide described above as a source material, it can be manufactured by mixing alkoxysilane such as tetraethoxysilane and alkoxytitanium such as tetrabutoxytitanium with each other at a desired molar ratio, causing hydrolysis thereof under an acidic condition to afford an aqueous sol, and with the aqueous sol as the W phase, carrying out the same steps as described above.

Further, the metal oxide powder of the present invention having a silica-alumina multiple oxide as the metal oxide may be manufactured for example by reacting a mixture of sodium silicate and sodium aluminate with an acid to prepare a mixed sol, or mixing a silica sol obtained by reacting sodium silicate with an acid, and an alumina sol obtained by hydrolyzing aluminum triethoxide to prepare a mixed sol in the metal oxide sol preparation step described above, and thereafter subjecting the mixed sol to the emulsion formation step and the subsequent steps described above.

The metal oxide powder of the present invention having a multiple metal oxide other than the silica-alumina multiple oxide as the metal oxide may also be manufactured for example by mixing, at a proper mixing ratio, a plurality of metal hydroxide sols prepared independently by the known method described above, to thereby prepare a mixed sol having a desired metal composition ratio, and thereafter subjecting the mixed sol to the emulsion formation step and the subsequent steps described above.

(Structure, Properties, and Uses)

Figure 8:
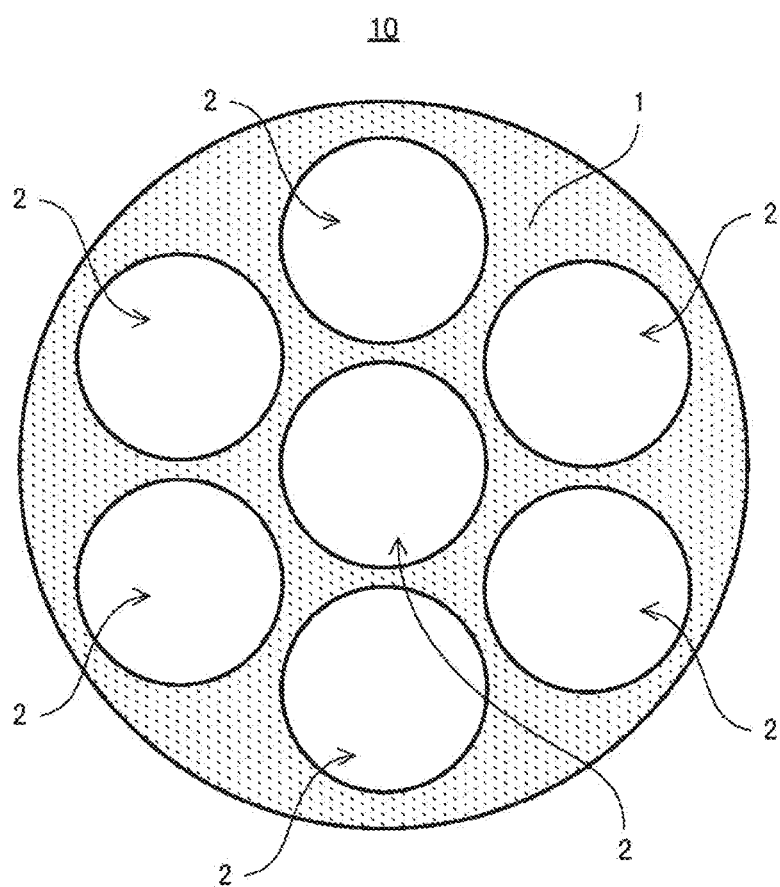
FIG. 8 is a cross-sectional view of an independent particle of the metal oxide powder manufactured by the manufacturing method described in FIG. 7 to explain a typical internal structure of the independent particle.

FIG. 8 is a cross-sectional view schematically illustrating a typical internal structure of an independent particle 10 of the metal oxide powder of the present invention manufactured by the manufacturing method S10 described above. As shown in FIG. 8, the independent particle 10 has a substantially globular metal oxide gel part 1 (hereinafter sometimes simply referred to as "gel part 1") and a plurality of hollow spaces 2, 2, (hereinafter sometimes referred to as "hollow spaces 2, 2, . . . " or simply "hollow space 2") that are provided in the gel part 1. The shape and the size of the gel part 1 generally correspond to those of the W phase of the O/W/O emulsion formed in the above manufacturing method S10. In addition, the shape and the size of the hollow spaces 2, 2, . . . generally correspond to those of the O phase (oil droplets) present inside the W phase of the O/W/O emulsion.

The metal oxide gel constituting the gel part 1 is itself an aerogel having a high porosity (usually a porosity of no less than 60%). Therefore, the thermal conductivity of the gel part 1 itself is also largely reduced compared with ordinary metal oxide gels. In addition, as the independent particle 10 has a multi-hollow structure with hollow spaces (large voids) 2, 2, . . . in the gel part 1, the bulk density of the metal oxide powder is reduced, and as a result contribution of solid conduction in heat transfer is reduced even more effectively. The existence of the hollow spaces in the independent particle is reflected in such characteristics as the high oil absorption of no less than 250 mL/100 g, the relatively large ratio of the oil absorption to the BJH pore volume, and the reduced bulk density, as described above.

In FIG. 8 and the above descriptions regarding FIG. 8, the independent particle having a plurality of hollow spaces in the metal oxide gel part has been explained, but the independent particle of the metal oxide powder of the present invention is not limited to this configuration. For example, where there are a number of W phases in the O/W/O emulsion, some of the W phases may have only one O phase (oil droplet) therein. In such a case, an independent particle afforded by gelation of the W phase having only one O phase has only one hollow space in the metal oxide gel part.

When the metal oxide powder of the present invention is manufactured by the method described above, it shows hydrophobicity, but it can be made hydrophilic by thermally decomposing the hydrophobic groups on the surface of the metal oxide. For example, the hydrophobic groups on the surface can be thermally decomposed by keeping the metal oxide for about 1 to 8 hours at a temperature of 400 to 600° C. under a non-oxidizing atmosphere (nitrogen atmosphere etc.).

The metal oxide powder of the present invention can be favorably used as a thermal insulator, a dew condensation preventing material, or a soundproofing material. In such uses, it is, for example, sandwiched by a double glass or between transparent plastic plates, sandwiched between films to make a sheet, or incorporated into a wall as a core material of a thermal insulator. It can also be used as a thermal insulating coating by being added to a coating material. In this use, thermal insulation performance can be exhibited effectively since the air phase in the hollow space is maintained to a certain extent. A high frosting effect can also be shown.

The metal oxide powder of the present invention can also be favorably used as cosmetics, deodorants, or hairdressing products since it absorbs oil on the skin efficiently due to its large oil absorption, and since it can resist sweat when it is hydrophobic. Further, since a compound having a high moisturizing effect can be enclosed in the hollow space, it is seen that a higher moisturizing effect can also be expected when the metal oxide powder of the present invention is used for such cosmetic purposes as above. It is also considered that enclosing another medicinal substance in the hollow space allows a wide variety of uses such as DDS.

EXAMPLES

Examples will be shown below to explain the present invention in more detail. However, the present invention is not limited to Examples. In Examples and Comparative Examples, the concentration of hexane in acetone washing liquid and the concentration of an alcohol in hexane washing liquid were measured by gas chromatography. The amount of water in an alcohol washing liquid was measured by Karl Fischer's method. The electrical conductivity of washing water was measured using an electrical conductivity meter. The manufacturing conditions of each Example and Comparative Example are simply given in Table 1.

Example 1

(Metal Oxide Sol Preparation Step)

Sodium silicate having a concentration of $SiO_2$: 15 g/100 mL and $Na_2O$: 5.1 g/100 mL, and sulfuric acid having a concentration of 10.3 g/100 mL were prepared. A solution of the sodium silicate and the sulfuric acid were mixed with each other by collision in a piping at a flow rate of 1.08 L/min for the solution of the sodium silicate and 0.99 L/min for the sulfuric acid, to afford a silica sol. The pH of the silica sol was 1.67.

The silica sol with a concentration of 8.0 g/100 mL was diluted with water to have a concentration of 6.0 g/100 mL. Thereafter, sodium silicate ($SiO_2$: 6.0 g/100 mL, $Na_2O$: 2.0 g/100 mL) was added to the silica sol until the pH of the mixture became 4.5.

(Emulsion Formation Step and Gelation Step)

To 100 mL of the silica sol prepared above, 50 mL of hexane and 0.25 g of polyoxyethylene (20) sorbitan monooleate were added, and the resultant mixture was stirred at 11000 rpm for one minute using a homogenizer (T25BS1, manufactured by IKA), to afford an O/W emulsion. Thereafter, 230 mL of hexane was added to the emulsion, 0.25 g of sorbitan monooleate was added thereto, and the resultant mixture was stirred at 11000 rpm for two minutes using a homogenizer (T25BS1, manufactured by IKA), to afford an O/W/O emulsion. The O/W/O emulsion was aged in a water bath of 40° C. During the aging, gelation of the silica sol occurred.

(Solvent Replacement Step)

Then, the solution produced above in which the gel was dispersed was centrifuged to precipitate the gel. The procedure of adding 400 mL of acetone as a washing liquid to the gel, mixing them together, and thereafter performing centrifugation was repeated five times, to wash and remove hexane in the gel. The concentration of hexane in the acetone solution which was finally separated was 1.5 mass %.

Next, washing by the centrifugation described above was performed using ion-exchanged water as a washing liquid, to remove salt in the gel. The electrical conductivity of the washings finally separated was 65 µS/cm.

Thereafter, washing by the centrifugation described above was performed using an alcohol solution (ethanol: 90%; isopropyl alcohol: 10%) as a washing liquid, to remove water in the gel. The amount of water in the alcohol solution after the washing which was finally separated was 3.0 mass %.

Furthermore, washing by the centrifugation described above was performed using hexane as a washing liquid, to remove the alcohol in the gel. The concentration of the alcohol in hexane which was finally separated was: 2.1 mass % for ethanol and 0.2 mass o for isopropyl alcohol.

(Hydrophobing Treatment Step)

Next, hexane was added to the washed gel to make the entire volume be 400 mL. 4.5 g of dichlorodimethylsilane was added thereto. The gel was kept for 24 hours at 40° C. while stirring, to be hydrophobized.

(Drying Step)

The hydrophobized gel was separated by vacuum filtration and washed with 800 mL of hexane. The gel was dried under atmospheric pressure under flow of nitrogen, to afford the metal oxide powder of the present invention. The drying temperature and the drying time were: 3 hours at 40° C.; then 2 hours at 50° C.; and thereafter 12 hours at 150° C. The properties of the metal oxide powder thus obtained are shown in Table 2.

Example 2

A silica sol with a concentration of 8.0 g/100 mL was prepared by the same procedure as in Example 1, and sodium silicate ($SiO_2$: 8.0 g/100 mL, $Na_2O$: 2.7 g/100 mL) was added to the silica sol until the pH of the mixture became 4.5. Thereafter, the same procedure was carried out as in Example 1, except that the aging in the water bath of 40° C. was not performed. The concentration of hexane in acetone which was finally eluted in the washing by acetone was 1.5 mass %. The electrical conductivity of the washings which was finally separated in the washing by the ion-exchanged water was 52 µS/cm. The amount of water in the alcohol which was finally eluted in the washing by the alcohol was 3.0 mass %. The concentration of the alcohol in hexane which was finally eluted in the washing by hexane was: 2.1 mass % for ethanol and 0.2 mass % for isopropyl alcohol. The properties of the metal oxide powder thus obtained are shown in Table 2.

Example 3

Sodium silicate having a concentration of $SiO_2$: 28 g/100 mL and $Na_2O$: 9.7 g/100 mL, and sulfuric acid having a concentration of 19.3 g/L were prepared. The sodium silicate solution and the sulfuric acid were mixed with each other by collision in a piping at a flow rate of 1.08 L/min for the sodium silicate solution and 0.99 L/min for the sulfuric acid, to afford a silica sol. The pH of the silica sol thus obtained was 1.52.

Sodium silicate ($SiO_2$: 15 g/100 mL, $Na_2O$: 5.1 g/100 mL) was added to the silica sol having a concentration of 15 g/100 mL until the pH of the mixture became 3. Thereafter, the same procedure was carried out as in Example 1, except that the aging in the water bath of 40° C. was not performed.

The concentration of hexane in acetone which was finally eluted in the washing by acetone was 1.5 mass %. The electrical conductivity of the washings which was finally separated in the washing by the ion-exchanged water was 54 µS/cm. The amount of water in the alcohol which was finally eluted in the washing by the alcohol was 2.9 mass 1. The concentration of the alcohol in hexane which was finally eluted in the washing by hexane was: 2.3 mass % for ethanol and 0.3 mass % for isopropyl alcohol. The properties of the metal oxide powder thus obtained are shown in Table 2.

Example 4

The metal oxide powder of the present invention was produced in the same manner as in Example 3, except that chlorotrimethylsilane was used in the hydrophobing treatment step instead of dichlorodimethylsilane.

The concentration of hexane in acetone which was finally eluted in the washing by acetone was 1.3 mass %. The electrical conductivity of the washings which was finally separated in the washing by the ion-exchanged water was 67 µS/cm. The amount of water in the alcohol which was finally eluted in the washing by the alcohol was 2.5 mass 1. The concentration of the alcohol in hexane which was finally eluted in the washing by hexane was: 2.3 mass % for ethanol, and 0.3 mass % for isopropyl alcohol. The properties of the metal oxide powder thus afforded are shown in Table 2.

Example 5

(Metal Oxide Sol Preparation Step, Emulsion Formation Step, and Gelation Step)

A silica sol was prepared by the same procedure as in Example 1, and sodium silicate ($SiO_2$: 8.0 g/100 mL, $Na_2O$: 2.7 g/100 mL) was added to the silica sol until the pH of the mixture became 3. Thereafter, with 100 mL of the silica sol, an O/W/O emulsion was prepared in the same manner as in Example 1. Then, sodium silicate ($SiO_2$: 8.0 g/100 mL, $Na_2O$: 2.7 g/100 mL) was further added to the emulsion so as to make the pH of the mixture become 6, and thereby gelation was caused.

(Solvent Replacement Step)

A gel thus obtained was put in a column. Hexane in the gel was removed by replacing with 4 L of acetone. Salt was removed by 4 L of ion-exchanged water. The solvent in the gel was replaced with 4 L of ethanol, followed by replacement with 2.4 L of hexane. The concentration of hexane in acetone which finally flowed out in the replacement with acetone was 0.1 mass %. Likewise, the electrical conductivity of the washings which finally flowed out in the washing by the ion-exchanged water was 31 µS/cm. The amount of water in the alcohol which finally flowed out in the replacement with the alcohol was 0.1 mass %. The concentration of the alcohol in hexane which finally flowed out in the replacement with hexane was 0.1 mass % for ethanol.

(Hydrophobing Treatment)

Hexane was added to the gel to make the entire volume of the mixture be 200 ml, and then 4.5 g of dichlorodimethylsilane was added thereto. Thereafter, the gel was kept for 24 hours at 40° C. while stirring, to be hydrophobized.

(Drying Step)

The hydrophobized gel was separated by vacuum filtration and washed with 800 ml of hexane. The gel was dried under atmospheric pressure under flow of nitrogen, to thereby afford the metal oxide powder of the present invention. The drying temperature and the drying time was: 3 hours at 40° C.; then 2 hours at 50° C.; and thereafter 12 hours at 150° C. The properties of the metal oxide powder thus afforded are shown in Table 2.

Comparative Example 1

In Comparative Example 1, gelation of a silica sol was caused in a W/O emulsion, not in an O/W/O emulsion.

(Metal Oxide Sol Preparation Step)

A solution of JIS sodium silicate No. 3 (JIS K1408) was diluted to adjust the concentration thereof to be $SiO_7$: 15 g/100 mL and $Na_2O$: 5.1 g/100 mL. In addition, sulfuric acid with a concentration of 10.3 g/100 mL was prepared. The solution of sodium silicate and the sulfuric acid were mixed with each other by collision in a piping at a flow rate of 1.08 L/min for the sodium silicate solution and 0.99 L/min for the sulfuric acid, to afford a silica sol. The pH of the silica sol thus obtained was 2.9.

(Emulsion Formation Step and Gelation Step)

To 100 mL of the silica sol, 150 mL of hexane was added, 0.4 g of sorbitan monooleate was added, and the resultant mixture was stirred at 11000 rpm for one minute using a homogenizer (T25BS1 manufactured by IKA), to afford a WO emulsion. While the emulsion was stirred by a mixer, sodium silicate ($SiO_2$: 8.0 g/L, $Na_2O$: 27 g/L) was added to the emulsion until the pH of the sol became 6. After continuing stirring for five minutes, 100 ml of water was added, and the aqueous phase was separated to afford a gel.

(Solvent Replacement Step)

The gel was put in a column and was washed with 2 L of ion-exchanged water. Thereafter, the solvent in the gel was replaced with 2 L of ethanol, followed by replacement with 1.2 L of hexane. The electrical conductivity of the washings which finally flowed out in the washing by the ion-exchange water was 67 µS/cm. The amount of water in ethanol which finally flowed out in the replacement with ethanol was 3.4 mass %. The concentration of ethanol in hexane which finally flowed out in the replacement with hexane was 1.9 mass %.

(Hydrophobing Treatment Step)

Hexane was added to the gel make the entire volume of the mixture be 200 ml, and then 10 g of chlorotrimethylsilane was added thereto. Then, the gel was kept for 24 hours at 40° C., to be hydrophobized.

(Drying Step)

The hydrophobized gel was separated by vacuum filtration and washed with 800 ml of hexane. The gel was dried under atmospheric pressure under flow of nitrogen. The drying temperature and the drying time was: 3 hours at 40° C.; then 2 hours at 50° C.; and thereafter 12 hours at 150° C. The properties of the metal oxide powder thus obtained are shown in Table 2.

Comparative Example 2

A metal oxide powder was produced by the same method as in Comparative Example 1, except that the hydrophobing treatment was carried out using dichlorodimethylsilane instead of chlorotrimethylsilane. The electrical conductivity of the washings which finally flowed out in the washing by the ion-exchange water was 54 µS/cm. The amount of water in ethanol which finally flowed out in the replacement with ethanol was 3.1 mass %. The concentration of ethanol in hexane which finally flowed out in the replacement with hexane was 2.2 mass %. The properties of the metal oxide powder thus obtained are shown in Table 2.

TABLE 1

| | Manufacturing Conditions | | | | |
|---|---|---|---|---|---|
| | Sol Concentration (g/L) | Aging Time of Gel (h) | Treating Agent | Amount of Water after Replacement with Alcohol (mass %) | Concentration of Alcohol after Replacement with Hexane (mass %) | |
| | | | | | ethanol | IPA |
| Example 1 | 60 | 3 | DMDCS | 3.0 | 2.1 | 0.2 |
| Example 2 | 80 | 0 | DMDCS | 3.0 | 2.1 | 0.2 |
| Example 3 | 150 | 0 | DMDCS | 2.9 | 2.3 | 0.3 |
| Example 4 | 150 | 0 | TMCS | 2.5 | 2.3 | 0.3 |
| Example 5 | 80 | 0 | DMDCS | 0.1 | 0.1 | — |
| Comparative Example 1 | 80 | 0 | TMCS | 3.4 | 1.9 | — |
| Comparative Example 2 | 80 | 0 | DMDCS | 3.1 | 2.2 | — |

DMDCS: dichlorodimethylsilane
TMCS: chlorotrimethylsilane
IPA: isopropyl alcohol

TABLE 2

| | Properties | | | | | | | | | |
|---|---|---|---|---|---|---|---|---|---|---|
| | Ratio of the Number of Globular Independent Particles (%) | Bulk Density (g/L) | BJH Pore Volume (cm³/g) | BET Specific Surface Area (m²/g) | Oil Absorption (mL/100 g) | C Value (mass %) | Oil Absorption/ Pore Volume | Average Particle Size (µm) | Diameter of Hollow Space (µm) | Average Circularity |
| Example 1 | 85 | 76 | 4.3 | 694 | 330 | 9.6 | 0.77 | 9 | 1 to 5 | 0.80 |
| Example 2 | 90 | 80 | 4.4 | 770 | 380 | 10.2 | 0.86 | 11 | 1 to 8 | 0.86 |
| Example 3 | 95 | 112 | 2.9 | 805 | 270 | 11.7 | 0.92 | 10 | 1 to 8 | 0.91 |
| Example 4 | 95 | 119 | 2.6 | 817 | 280 | 13.3 | 1.08 | 12 | 1 to 8 | 0.93 |
| Example 5 | 90 | 49 | 5.7 | 594 | 500 | 7.7 | 0.88 | 10 | 1 to 8 | 0.90 |
| Comparative Example 1 | 95 | 103 | 4.0 | 625 | 200 | 13.6 | 0.50 | 9 | — | 0.88 |
| Comparative Example 2 | 95 | 122 | 4.3 | 747 | 210 | 9.8 | 0.49 | 11 | — | 0.87 |

<Evaluation Method>

The following items regarding the metal oxide powders produced in Examples 1 to 5 and Comparative Examples 1 and 2 were evaluated. The results are shown in Table 2.

(Measurement of Ratio of Number of Globular Independent Particles)

An SEM image of no less than 2000 metal oxide powder particles observed at a magnification of 1000 using SEM (S-5500 manufactured by Hitachi High-Technologies Corporation; acceleration voltage of 3.0 kV; secondary electron detection) was analyzed; and the ratio of the number of globular independent particles to the total number of particles that were entirely included in the SEM image was calculated. Whether a particle was a "globular independent particle" or not was determined based on the definition given above.

(Measurement of Average Circularity and Average Particle Size)

The SEM image of no less than 2000 metal oxide powder particles observed at a magnification of 1000 using SEM (S-5500 manufactured by Hitachi High Technologies Corporation; acceleration voltage of 3.0 kV; secondary electron detection) was analyzed; and the average circularity and the average particle size of the particles were calculated based on the definition given above.

(Measurement of Diameter of Hollow Space)

The SEM image of no less than 2000 metal oxide powder particles observed at a magnification of 1000 using SEM (S-5500 manufactured by Hitachi High Technologies Corporation; acceleration voltage of 30.0 kV; secondary electron detection) was analyzed; and the diameter of a circle having an area equal to the projected area of the image of the hollow space identified in the particle (i.e. equivalent circle diameter) was calculated and the range thereof was recorded.

(Measurement of Other Properties)

The BET specific surface area and the BJH pore volume were measured by BELSORP-max manufactured by BEL Japan, INC., based on the definition given above. The oil absorption was measured by "Refined Linseed Oil Method" specified in JIS K5101-13-1.

The carbon content ("C Value" in Table 2) was measured by using vario MICRO CUBE manufactured by Elementar Co., Ltd. to quantify the amount of carbon dioxide produced in an oxidation treatment carried out under flow of oxygen and helium at a temperature of 1150° C.; and the carbon content was calculated in mass % based on the total amount (100 mass %) of the metal oxide powder.

The bulk density was measured by the constant mass measurement method prescribed in JIS R1628.

<Evaluation Results>

In all the metal oxide powders of Examples 1 to 5, the ratio of globular independent particles was no less than 85%, and it was confirmed that the metal oxide powders of Examples, 1 to 5 were mainly composed of globular independent particles. The BET specific surface area, the BJH pore volume, and the oil absorption thereof also met the level required for the metal oxide powder of the present invention. In addition, the average circularity and the average particle size thereof were also in the favorable range. The results demonstrate that the metal oxide powders of the present invention have favorable thermal insulation properties.

It is understood that there is a positive correlation between the sol concentration and the bulk density of the metal oxide produced, by comparing the bulk density of the metal oxide powder of Example 1, wherein the sol concentration was 60 g/L, the bulk density of the metal oxide powder of Example 2, wherein the sol concentration was 80 g/L, and the bulk density of the metal oxide powders of Examples 3 and 4, wherein the sol concentration was 150 g/L. Therefore, in order to evaluate the bulk density appropriately, comparison will be made between the bulk densities of the metal oxide powders of Example 2 and Comparative Example 2, both of which employed the same sol concentration and the same hydrophobing agent. The bulk density (80 g/L) of the metal oxide powder of Example 2 is smaller than the bulk density (122 g/L) of the metal oxide powder of Comparative Example 2 by 34%. This shows that the bulk density of the metal oxide powder of the present invention can be reduced. In the metal oxide powder (bulk density: 49 g/L) of Example 5, in which the solvent replacement was performed thoroughly, the reduction of the bulk density was as much as 60%.

As described above, the oil absorption of all the metal oxide powders of Examples 1 to 5 was no less than 250 mL/100 g. On the other hand, the oil absorption of the metal oxide powders of Comparative Examples 1 and 2, wherein gelation was caused in the W/O emulsion and not in the O/W/O emulsion, was less than 250 mL/100 g.

In addition, in all the metal oxide powders of Examples 1 to 5, the ratio of the oil absorption to the BJH pore volume was no less than 0.70. On the other hand, in the metal oxide powders of Comparative Examples 1 and 2, the ratio was only about 0.5.

According to these results, it can be confirmed, from the bulk properties, that the metal oxide powders of Examples 1 to 5 have a hollow space in the particle thereof. In fact, it was confirmed by SEM observation (acceleration voltage: 30 kV) and STEM observation that the metal oxide powders of Examples 1 to 5 had a hollow space (see FIGS. 2 and 3 for Example 1). On the other hand, in the observation of the metal oxide powders of Comparative Examples 1 and 2, a hollow space was not confirmed in the particle thereof (see FIGS. 5 and 6 for Comparative Example 1).

These results show that the effect of reducing the bulk density exhibited by the present invention is attributed to the hollow space existing in the particle of the metal oxide powder of the present invention and attributed to the step of forming the O/W/O emulsion included in the method for manufacturing the metal oxide of the present invention. The results also show that the existence of the hollow space in the particle of the metal oxide powder of the present invention is clearly reflected in the large oil absorption (especially in the large ratio of the oil absorption to the pore volume).

DESCRIPTION OF THE REFERENCE NUMERALS

1 metal oxide gel part
2, 2, . . . (a plurality of) hollow spaces
10 independent particle

The invention claimed is:

1. A metal oxide powder comprising globular independent particles as main component,
said metal oxide powder having:
BET specific surface area of 400 to 1000 m$^2$/g;
BJH pore volume of 2 to 8 mL/g; and
oil absorption measured by refined linseed oil method specified in JIS K5101-13-1 of no less than 250 mL/100 g, wherein each said independent particle includes therein one or more hollow space having a size of 0.5 to 15 μm; and wherein the metal oxide powder has been hydrophobized by one or more silylating agent represented by the following general formulae (6) to (8)

wherein in the general formula (6), n represents an integer of 1 to 3; R represents methyl group; and X represents a leaving group which can leave the molecule by cleavage of bond thereof with the Si atom in a reaction with a compound having a hydroxyl group,

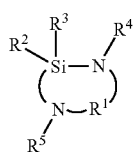

wherein in the general formula (7), $R^1$ represents an alkylene group; $R^2$ and $R^3$ each represent methyl group; and $R^4$ and $R^5$ independently represent a hydrogen atom or a hydrocarbyl group,

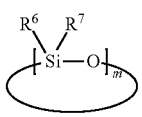

wherein in the general formula (8), $R^6$ and $R^7$ each represent methyl group; and m represents an integer of 3 to 6.

2. The metal oxide powder according to claim 1, wherein the ratio of the oil absorption to the BJH pore volume is no less than 0.70.

3. The metal oxide powder according to claim 1, having average particle circularity by image analysis method of no less than 0.80.

4. The metal oxide powder according claim 1, having average particle size by image analysis method of 1 to 20 μm.

5. The metal oxide powder according to claim 1, wherein the metal oxide is silica or a multiple oxide containing silica as the main component thereof.

6. A method for manufacturing a hollow and globular shaped metal oxide powder comprising the successive steps of:

(i) preparing an aqueous metal oxide sol;
(ii) forming an O/W/O emulsion wherein the aqueous metal oxide sol composes the W phase of the O/W/O emulsion;
(iii) causing gelation of the aqueous metal oxide sol, thereby converting the O/W/O emulsion into a dispersion of a gel;
(iv) replacing water in the dispersion with a solvent which has a surface tension at 20° C. of no more than 30 mN/m;
(v) treating the gel with a hydrophobing agent; and
(vi) removing the solvent used in the replacing step (iv), wherein the hydrophobing agent is one or more silylating agent represented by the following general formulae (6) to (8)

wherein in the formula (6), n represents an integer of 1 to 3; R represents methyl group; and X represents a leaving group which can leave the molecule by cleavage of bond thereof with the Si atom in a reaction with a compound having a hydroxyl group,

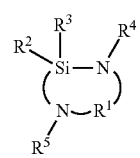

wherein in the formula (7), $R^1$ represents an alkylene group; $R^2$ and $R^3$ each represent methyl group; and $R^4$ and $R^5$ independently represent a hydrogen atom or a hydrocarbyl group,

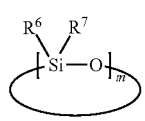

wherein in the formula (8), $R^6$ and $R^7$ each represent methyl group; and m represents an integer of 3 to 6.

7. A thermal insulator comprising:
the metal oxide powder according to claim 1.

8. The metal oxide powder according to claim 1, wherein the BJH pore volume is 4 to 8 mL/g.

* * * * *